US012785969B2

(12) United States Patent
Couleaud et al.

(10) Patent No.: US 12,785,969 B2
(45) Date of Patent: Nov. 3, 2026

(54) SYSTEMS AND METHODS FOR MANAGING DISCARDABLE EMAIL ADDRESSES

(71) Applicant: Adeia Guides Inc., San Jose, CA (US)

(72) Inventors: Jean-Yves Couleaud, Mission Viejo, CA (US); Charles Dasher, Lawrenceville, GA (US)

(73) Assignee: Adeia Guides Inc., San Jose, CA (US)

( * ) Notice: Subject to any disclaimer, the term of this patent is extended or adjusted under 35 U.S.C. 154(b) by 11 days.

(21) Appl. No.: 19/096,074

(22) Filed: Mar. 31, 2025

(65) Prior Publication Data

US 2026/0303348 A1 Oct. 1, 2026

(51) Int. Cl.
*H04L 9/32* (2006.01)
*H04L 9/08* (2006.01)
*H04L 61/45* (2022.01)

(52) U.S. Cl.
CPC .......... *H04L 9/3213* (2013.01); *H04L 9/0861* (2013.01); *H04L 61/4547* (2022.05)

(58) Field of Classification Search
CPC .. H04L 9/3213; H04L 9/0861; H04L 61/4547
See application file for complete search history.

(56) References Cited

U.S. PATENT DOCUMENTS 7,237,010 B2 * 6/2007 Mora ...................... H04L 51/48 709/206
2003/0046533 A1 * 3/2003 Olkin ...................... H04L 63/08 713/152
2005/0210107 A1 * 9/2005 Mora ..................... H04L 51/212 709/206
2014/0074490 A1 * 3/2014 Kundu ................. G06Q 30/016 705/1.1
2015/0026818 A1 * 1/2015 Lee ..................... G06F 21/6245 726/26
2018/0089668 A1 * 3/2018 Wong .................. G06Q 20/381

OTHER PUBLICATIONS

"Add or delete an alternate email address (email alias)", retrieved at https://support.google.com/a/answer/33327?hl=en#whatEmailAlias, retrieved on Jun. 5, 2025, 4 pages.
"MOAKT: Temporary mail service", retrieved at https://moakt.com/en/, retrieved on Jun. 5, 2025, 1 page.

(Continued)

*Primary Examiner* — Cheng-Feng Huang
(74) *Attorney, Agent, or Firm* — HG LAW LLP

(57) ABSTRACT

The present application provides for dynamic buffer management for managing discardable email addresses. A temporary email service provider (TESP) may generate a temporary email address for user registration of a user with an email sender server (ESS), and the TESP may generate a token signed with a private key and associated with the temporary email address. The TESP may then forward a modified email (with an encrypted token) to a primary email service (PEM). The PEM may be configured to validate the token by using public key obtained from a DNS server, and verify that the email meets usage limit criterion stored by the DNS server. If validated and verified, the PEM may then make the email visible in the PEM inbox of the user.

20 Claims, 15 Drawing Sheets

(56) References Cited

OTHER PUBLICATIONS

Google Safe Browsing: “What is Safe Browsing?”, retrieved at https://developers.google.com/safe-browsing, retrieved on Jun. 5, 2025, 2 pages.
guerillamail.com: “Guerrilla Mail—Disposable Temporary E-Mail Address”, retrieved at https://www.guerrillamail.com/about, retrieved on Jun. 5, 2025, 2 pages.
Icloud User Guide : “Create unique, random email addresses with Hide My Email and iCloud+”, retrieved at https://support.apple.com/enin/guide/icloud/mme38e1602db/1.0/icloud/1.0, retrieved on Jun. 5, 2025, 2 pages.
Schenck: “Google may soon let you create email aliases in an effort to fight spam (Update), You could soon be keeping your contact details private with Shielded Email.”, retrieved at https://www.androidauthority.com/google-shielded-email-3499803/, retrieved on Nov. 15, 2024, 7 pages.
Tempmail: “What is Disposable Temporary E-mail?”, retrieved at https://temp-mail.org/en/, retrieved on Jun. 5, 2025, 4 pages.

* cited by examiner

400

500

600

800

900

1000

SYSTEMS AND METHODS FOR MANAGING DISCARDABLE EMAIL ADDRESSES

BACKGROUND

This disclosure is related to systems and methods for managing email addresses, namely generating discardable email addresses to enhance security of email communication.

SUMMARY

One major concern with email processing systems is the risk of data breaches. If a company's database is compromised, attackers may gain access to both email addresses and/or associated passwords or hashes of passwords. Since many email addresses and passwords are reused across multiple sites, this creates a domino effect where a breach in one system can lead to unauthorized access across numerous accounts. Another challenge is spam and phishing attacks. When email addresses are used as login credentials, they are often collected and potentially shared by third-party services. This can lead to an increase in unsolicited emails and targeted phishing attacks. From a privacy perspective, using email addresses as login credentials creates a centralized identifier across platforms that may lead to cross-service tracking and loss of anonymity, as many systems can correlate activities tied to the same email address.

In one approach, discardable or ephemeral email addresses are implemented as login credentials. Discardable emails may offer numerous benefits, particularly in enhancing user privacy, security, and convenience. However, such discardable email systems, may lack control for connecting the discardable email system and a primary email system (e.g., Google™ Gmail™). In one approach, the discardable email may be totally separate from the primary email. However, in this case important emails may be missed. In another approach, the discardable email system forwards all emails to the primary address, which may result in forwarding of large amount of irrelevant emails (that will be deleted) wasting network resources and storage space. Such discardable email system and the primary email system may lack an interface to effectively create a system where relevant emails are forwarded while irrelevant emails do not reach the primary email inbox. Moreover, such discardable email systems fail to coordinate a certification with domain name system (DNS) to ensure requisite levels of security and trust are maintained. Without this type of security implementation, such discardable email systems either allow too much unwanted email, or conversely do not allow emails that are relevant to reach the primary inbox. Additionally, there is a lack of centralized management of such temporary emails. In particular, the emails are not disabled in cases of data breach which leads to a waste of networking resources and storage capacity to process emails sent to addresses that were compromised by the breach.

Consequently, there is a need for an approach that allows for enhanced security features to be implemented with a discardable email system that also provides for efficient integration within a primary email system and for centralized management of security.

To help address these problems, systems and methods are provided herein for managing discardable email addresses. In some embodiments, a temporary email service provider (TESP) may generate a temporary email address for a user to register with an email sender server (ESS). In some scenarios, a website may require registration of the user's email address to gain access to specific data of interest to the user or to certain services offered by the website; however, the user may be guarded in providing their primary email address and instead prefer to use a temporary email address service to safeguard their primary email address from unwanted promotional or potentially malicious emails. For example, a user, Joe Jamba, may be browsing a website, www.coolwidgets.com, for purchasing widgets. In some embodiments, the TESP (e.g., a TESP that has control of domain name, for example, 228mail.com and/or other domains) may generate a temporary email address, joe@228mail.com, for user registration with an email sending service (ESS) such as www.coolwidgets.com. The TESP may generate a token signed with a private key and associated with the temporary email address. The TESP may then cause the DNS server to provide an address of a mail server of the TESP based on requests associated with the temporary email address and store a public key (to decrypt the encrypted token), and store a usage limit criterion associated with the temporary email address (e.g., joe@228mail.com can only be used five times until Jan. 1, 2026). In some embodiments, the TESP may maintain a database of trust level scores for email domains based on history of emails received from the email domains. The TESP may then retrieve, in the database, a trust level score for the ESS that corresponds to the usage limit criterion. For example, the TESP may retrieve a trust level score for 228mail.com that corresponds to a usage limit criterion of five.

The mail server of the TESP may receive an email from the ESS, where the ESS obtains the address of the mail server of the TESP from the DNS server. The mail server of the TESP may then modify the email to include the token. Continuing with the example, the mail server of the TESP receives a promotional email from www.coolwidgets.com and modifies the promotional email with the signed token. The TESP may then forward the modified email to a primary email service (PEM), e.g., Gmail having the email joe@gmail.com of the user. The PEM may be configured to validate the token with the public key obtained from the at least one DNS server, and verify that the email meets the usage limit criterion stored by the DNS server. If validated and verified, the PEM may then make the email visible in the PEM inbox of the user. In response to determining that fewer or less emails were received via the temporary email address than the number of emails that are allowed to be sent to the temporary email address, the PEM may cause the number of emails that are allowed to be sent to the temporary email address to be reduced (e.g., decrement of one). Continuing with the example, the Gmail server may validate the token and verify that joe@228mail.com has only been used once (fewer than the limit of five uses based on the criterion). Upon the validation and verification, Gmail allows the promotional email from www.coolwidgets.com to enter the Gmail inbox for joe@gmail.com. In this way, the PEM is integrated into the operation of the TESP offering both efficient user experience and also heightened security implementation through verification of encrypted private keys stored at DNS servers in addition to validation of the usage limit criterion to prevent spam and other malicious security threats. This usage limit criterion is based on trust that serves to limit excessive volume of emails being made visible within the PEM inbox. For example, Cool Widgets may provide an initial email to give a status update on a placed order; however, the usage limit criterion prevents excessive later promotional emails or spamming from Cool Widgets and/or other entities sending emails.

In some embodiments, if for a second email received by the TESP, the PEM fails to validate an included token by decrypting the token with the public key obtained from the at least one DNS server, or fails to verify that the later email meets the usage limit criterion stored by the DNS server, then the PEM refrains from forwarding the second email to the PEM inbox of the user and transmits a token invalidation notification to the mail server of the TESP to deactivate the temporary email address. For example, if joe@228mail.com has been used six times which exceeds the limit of five based on the usage limit criterion, then the PEM refrains from forwarding another promotional email to primary inbox of joe@gmail.com and instead sends an invalidation notification to the 228mail.com server causing the 228mail.com server to deactivate joe@228mail.com. In some embodiments, the PEM may temporarily store the second email and may transmit an approval request requiring user input for approval from a user device interfacing with the PEM. If user approval is not received, or denied, the second email may be sent to a spam storage in the PEM.

As a result, strict limits that are not a complete block are enforced for forwarding emails to the main PEM mailbox. While some important emails in an important time period are delivered (e.g., emails relating to a widget order withing two weeks of the order), the main email inbox is kept clean from irrelevant emails sent long after the order, or worse, sent by other entities who acquired the email address via a data breach. Moreover, the limits can be managed, e.g., by extending criteria as trust is developed. Furthermore, in case of breach or in case of repeated emails actions to disable the email address is taken automatically without a need for the user to manually request deletion of the email address.

In some embodiments, the TESP may receive an indication of a data breach associated with the ESS and then invalidate the temporary email address and refrain from processing any emails directed to the invalidated temporary email address. For example, if the 228mail.com server determines, through notification, that coolwidgets.com has experienced a data breach, then 228mail.com invalidates joe@228mail.com and refrains from processing any emails directed to joe@228mail.com.

In some embodiments, the TESP, when generating the temporary email address for user registration of the user may receive image data associated with a scanned matrix barcode (e.g., QR code), wherein the image data comprises an indicator for the ESS. For example, a Cool Widgets advertisement may play on a smart television that provides a QR code for scanning. Upon using a mobile device to scan the QR code, the TESP (e.g., 228mail.com server) may receive QR code scan data that includes an indicator for www.coolwidgets.com asking for an email for subscription to promotional materials. In response to receiving the image data comprising the indicator for the ESS, the TESP may then generate the temporary email address for user registration of the user with the ESS. Thus, the primary email address is kept private, while a temporary email address (e.g., joe@228mail.com) is provided to coolwidgets.com through scanning the QR code from the smart television.

In some embodiments, the TESP, when generating the temporary email address for user registration of the user may receive a confirmation of authentication with a single sign-on service associated with the PEM. For example, the user may use a single sign-on service through Google's Gmail. In response to receiving the confirmation of authentication with the single sign-on service associated with the PEM, the TESP may then generate the temporary email address (e.g., joe@228mail.com) for user registration of the user, wherein the TESP (e.g., 228mail.com) is a module of the PEM (e.g., Gmail).

BRIEF DESCRIPTION OF THE DRAWINGS

The present disclosure, in accordance with one or more various embodiments, is described in detail with reference to the following figures.

Drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

Figure 1A:
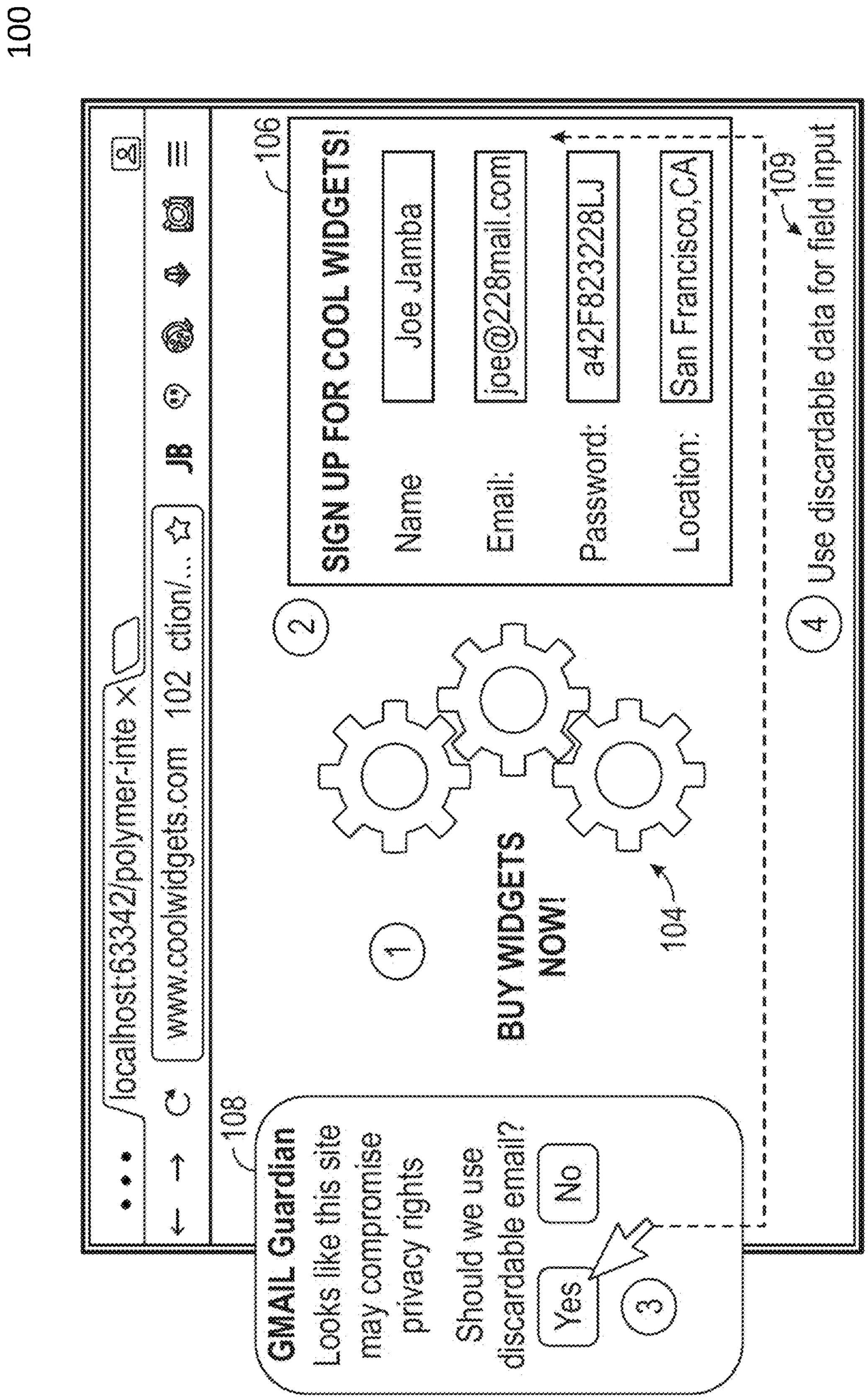
FIG. 1A shows an illustrative scenario in which a TESP embedded within a PEM provides for a temporary email address to be input into an electronic form requiring an email address input, in accordance with some embodiments of this disclosure.

FIG. 1A shows an illustrative scenario 100 in which a widget or an application of the temporary email service provider (TESP) running on top of a website domain of an email sender server (ESS) provides a temporary email address to be input into an electronic form requiring an email address input, in accordance with some embodiments of this disclosure. A website coolwidgets.com (e.g., provided by the ESS) 102 displays a message to "Buy Widgets Now!" 104 with an input form 106 stating "Sign up for Cool Widgets!" that requests name, email address, and location of a user for distribution of promotional material from Cool Widgets (in some embodiments, any other suitable input information may be requested). A TESP, termed Gmail Guardian 108 in this example, is overlaid on the user interface stating "Looks like this site may compromise privacy rights. Should we use discardable email? Yes, or No?"—where "yes" and "no" are presented as buttons for user interface input selection (in some approaches any suitable UI elements may be used). In some embodiments, the TESP may automatically generate a password associated with the temporary email address. In some approaches, an application programming interface (API) between the TESP and the ESS may exchange the password in plain text or generate a hash. In another approach the TESP may operate as part of the browser or as a browser extension.

Figure 1B:
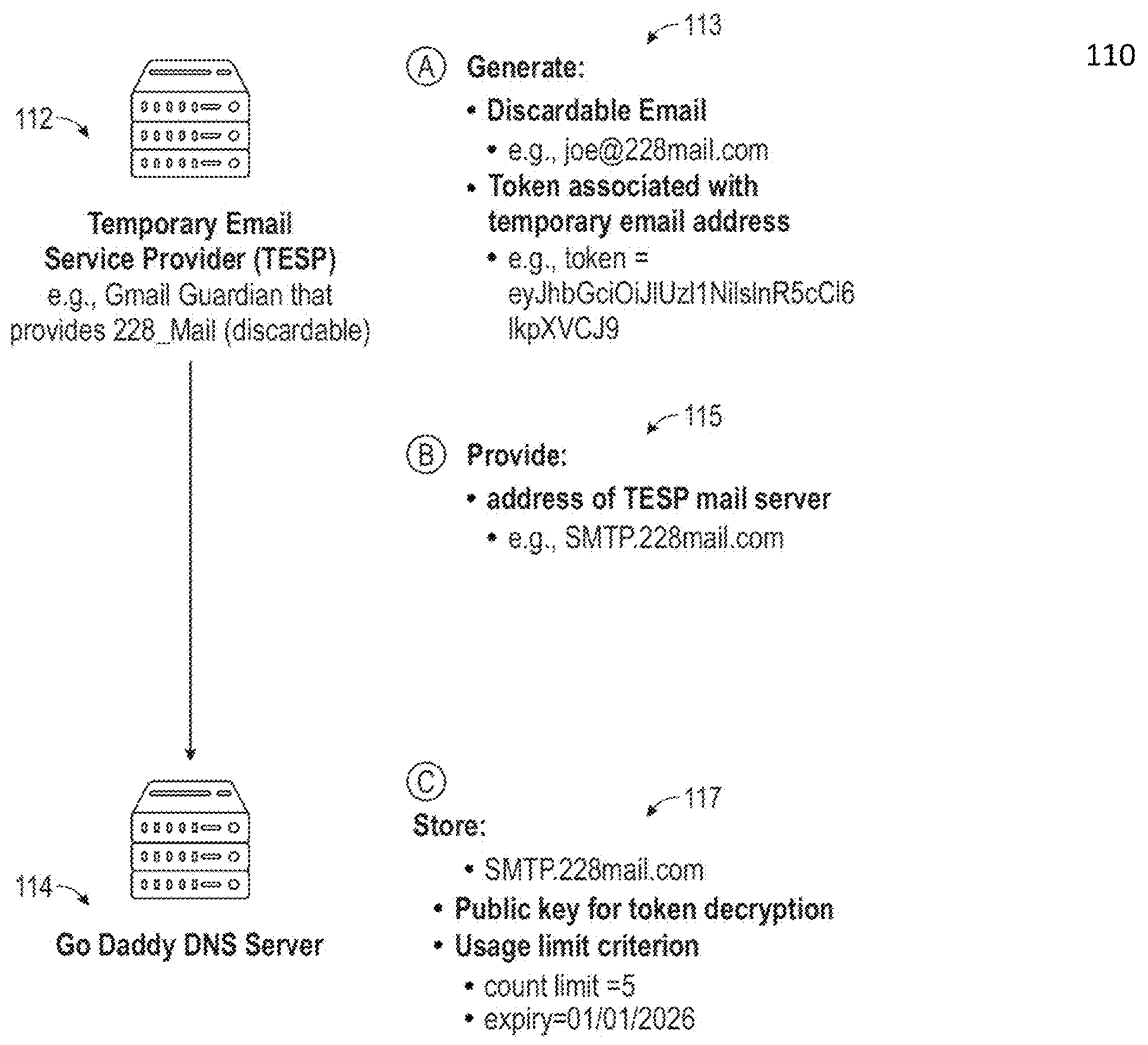
FIG. 1B shows an illustrative scenario in which the TESP provides its mail address to a DNS server, in accordance with some embodiments of this disclosure.

The application of the TESP may generate a temporary email address (and potentially other information) for user registration of a user with an ESS and input it into fields 106 (e.g., name, email, password and/or location). FIG. 1B shows an illustrative scenario 110 in which the application of the TESP registers its temporary email address to a DNS server, in accordance with some embodiments of this disclosure. At 113, the TESP (e.g., Gmail Guardian) generates a temporary email address using domain 228mail.com (which may be one of the domains controlled by the TESP). For example, the TESP generates a temporary email of joe@228mail.com. In some embodiments, the generation of a temporary email may implement a random number generator and/or other generators for alphanumeric string generation to generate a string that may be used as a prefix for the email address. In some embodiments, the TESP may implement various code that generates an alphanumeric string based on one or more algorithms (e.g., algorithms that are difficult to predict patterns in the generated strings). The TESP may operate an application that is executed by any suitable computing device capable of performing control circuitry instructions that is communicatively interfaced with other network enabled devices. For example, the application of the TESP may be run by a user device, by a remote server or by a combination of the two. The TESP may generate a token signed with a private key and associated with the temporary email address. In some embodiments, a cryptographic operation is applied to the token. For example, the token may be cryptographically signed using a private key. In other embodiments, the token may be encrypted with a private key (e.g., as a form of a signature). In yet other additional embodiments, the token may be hashed and the resulting hash may be salted and encrypted using the private key as a form of a signature. A token may be any encrypted alphanumeric code using one or more encryption techniques. In some embodiments, the token may be generated using any suitable cryptographic techniques. An example of a token may be seen below:

X-Discardable-Token:
eyJhbGciOiJIUzIlNiIsInR5cCI6IkpXVCJ9.eyJhZGRy
ZXNzIjoidXNIckBleGFtcGxILm
NvbSIsInVzZXNfYWxsb3dlZCI6NX0.s3cr3tT0k3n The encryption may be based on a public-private key configuration that provides for a pair of keys namely, a public key for encryption and a private key for decryption. When a secure message is sent, the message is encrypted with the recipient's public key, and only the recipient may decrypt the encrypted message with their private key. This method ensures secure communication and can also authenticate the sender's identity through digital signatures. To sign a message, a hash of the message is encrypted with a private key. On reception, the recipient acquires a public key from a trusted sources (e.g., a DNS server record) and decrypt the hash which can then be compared to a locally generated hash. A match proves the identity of the sender.

After generating the signed token the TESP sends appropriate messages to the DNS server to configure the DNS server to provide an address of a mail server of the TESP based on requests associated with the temporary email address. For example, the DNS server may be configured based on messages from the TESP to return SMTP.228mail.com as the email server for handling emails addressed to joe@228mail.com.

Additionally, the DNS server may be configured (e.g., by messages from the TESP) to store a public key for decrypting the token and store at least one usage limit criterion associated with the temporary email address. The DNS server may include one or more separate DNS servers. A usage limit criterion may be a criterion that specifies how many times the temporary email address may be used prior to be deactivated. In some embodiments, this usage limit criterion is based on trust level (e.g., based on history maintained by the TESP) that serves to limit excessive volume of emails being made visible within the PEM inbox. For example, Cool Widgets may provide an email to give a status update on a placed order; however, the usage limit criterion prevents excessive promotional emails or spamming from Cool Widgets and/or other entities (e.g., entities who bought the email from Cool Widgets, or entities that acquired the email from a data breach) sending emails. In some embodiments, the usage limit criterion may also include an expiry of the temporary email address. In some embodiments, the usage limit criterion may be a plurality of criterion resulting in usage limit criteria. In other embodiments, the usage limit criteria may include an expiry date for the temporary email address (e.g., for example the temporary email address may expire within 12 months of creation of the temporary email address). Returning to FIG. 1B, the TESP provides 115 the address of the TESP server (e.g., SMTP.228mail.com) to the DNS server (e.g., GoDaddy® DNS server) 114. At 117, the GoDaddy DNS server stores the address of the TESP server and stores the public key and usage limit criterion (e.g., count limit=5, and temporary email address expiry=Jan. 1, 2026).

Figure 1C:
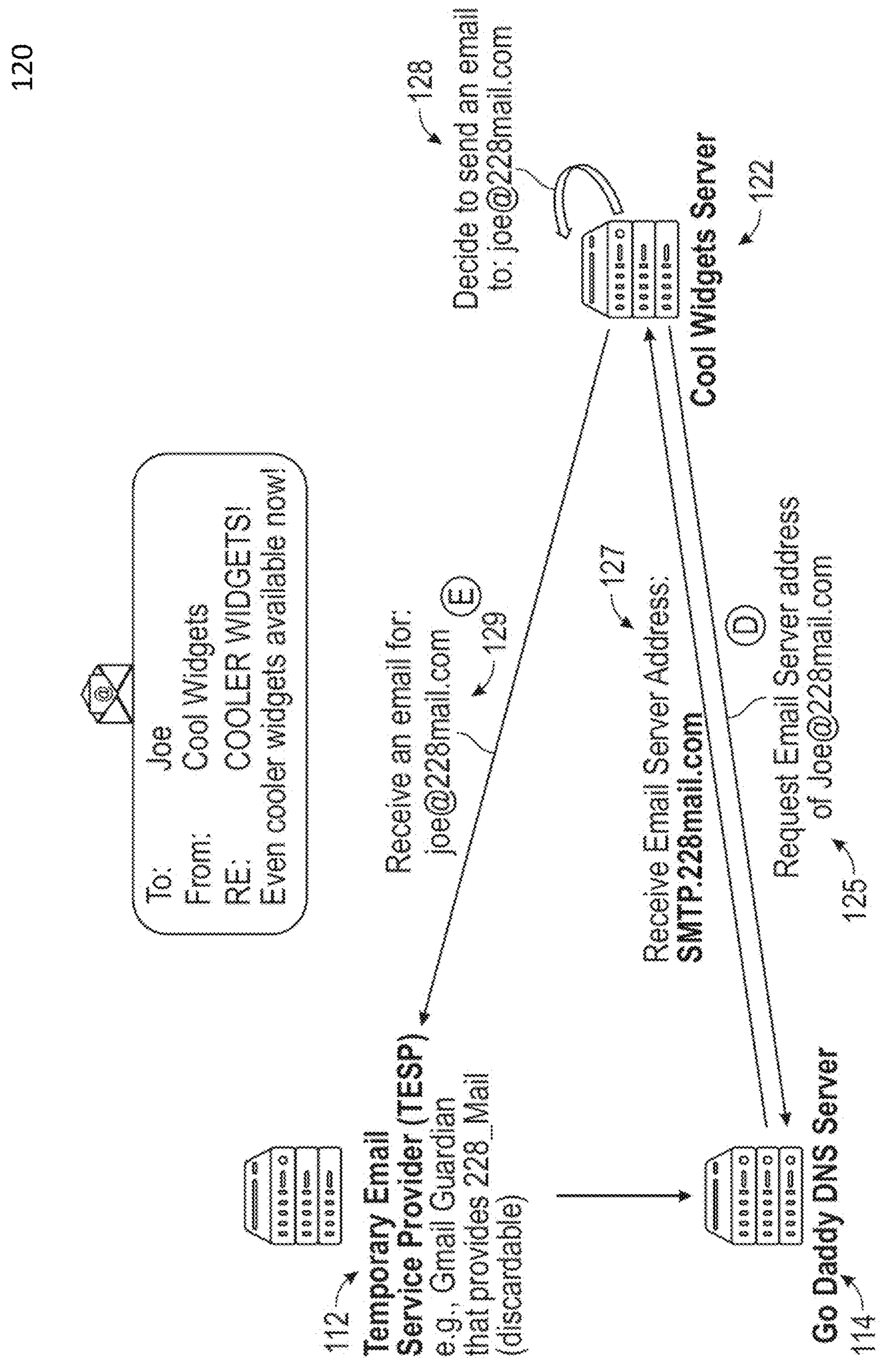
FIG. 1C shows an illustrative scenario in which the ESS provides an email to the TESP using the temporary email address, in accordance with some embodiments of this disclosure.

The TESP may receive an email from the ESS. The ESS may obtain the address of the mail server of the TESP from the at least one DNS server. FIG. 1C shows an illustrative scenario 120 in which the ESS provides an email to the TESP using the temporary email address, in accordance with some embodiments of this disclosure. The ESS (e.g., Cool Widgets Server) 122 requests 125 the email server address of joe@228mail.com from GoDaddy DNS Server 114. The GoDaddy DNS Server 114 provides 127 the email server address of the TESP (e.g., SMTP.228mail.com) to the ESS Cool Widgets Server 122. The ESS Cool Widgets Server 122 determines to send a promotional email to joe@228mail.com 128. The TESP Gmail Guardian 112 receives 129 the email from ESS directed at joe@228mail.com which includes the message "Even cooler widgets available now!"

Figure 1D:
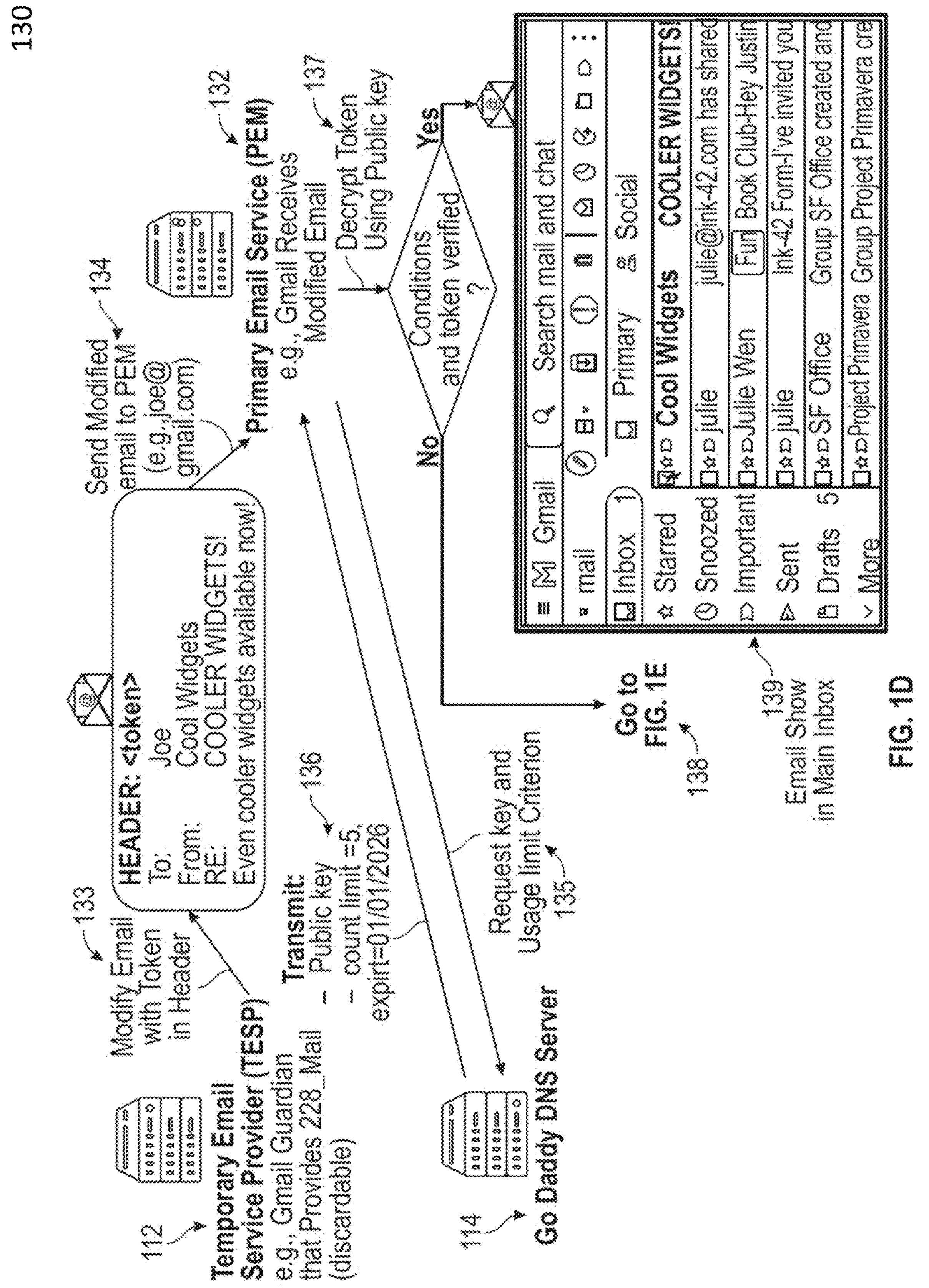
FIG. 1D shows an illustrative scenario in which the PEM determines whether the token is validated, and usage limit criterion is verified, in accordance with some embodiments of this disclosure.

The TESP may modify the email to include the token and forward the modified email to a PEM of the user. FIG. 1D shows an illustrative scenario 130 in which the PEM determines whether the token is validated, and usage limit criterion is verified, in accordance with some embodiments of this disclosure. The Gmail Guardian TESP 112 modifies 133 the email with the token in the header (e.g., the token signed with a private key) of the email and sends 134 the modified email to the PEM (e.g., Gmail) 132 using the primary email (e.g., joe@gmail.com). The PEM may validate the token by decrypting the token with the public key obtained from the at least one DNS server. The PEM may then verify that the email meets the usage limit criterion stored by the at least one DNS server. The PEM may then forward the email to the PEM inbox of the user based on the validating and the verifying. Returning to FIG. 1D, the Gmail PEM requests 135 the public key and usage limit criterion from the Go Daddy DNS Server 114 which, in response, transmits 136 the public key and usage limit criterion (e.g., count limit=5, expiry Jan. 1, 2026) to the Gmail PEM 132. At 137, the Gmail PEM verifies the token using the retrieved public key to validate the token. The Gmail PEM 132 then determines whether the usage limit criterion is verified. For example, if the usage limit is less than 5, which in this case is true and thus the Gmail PEM 132 forwards the email to the PEM inbox 139.

Figure 1E:
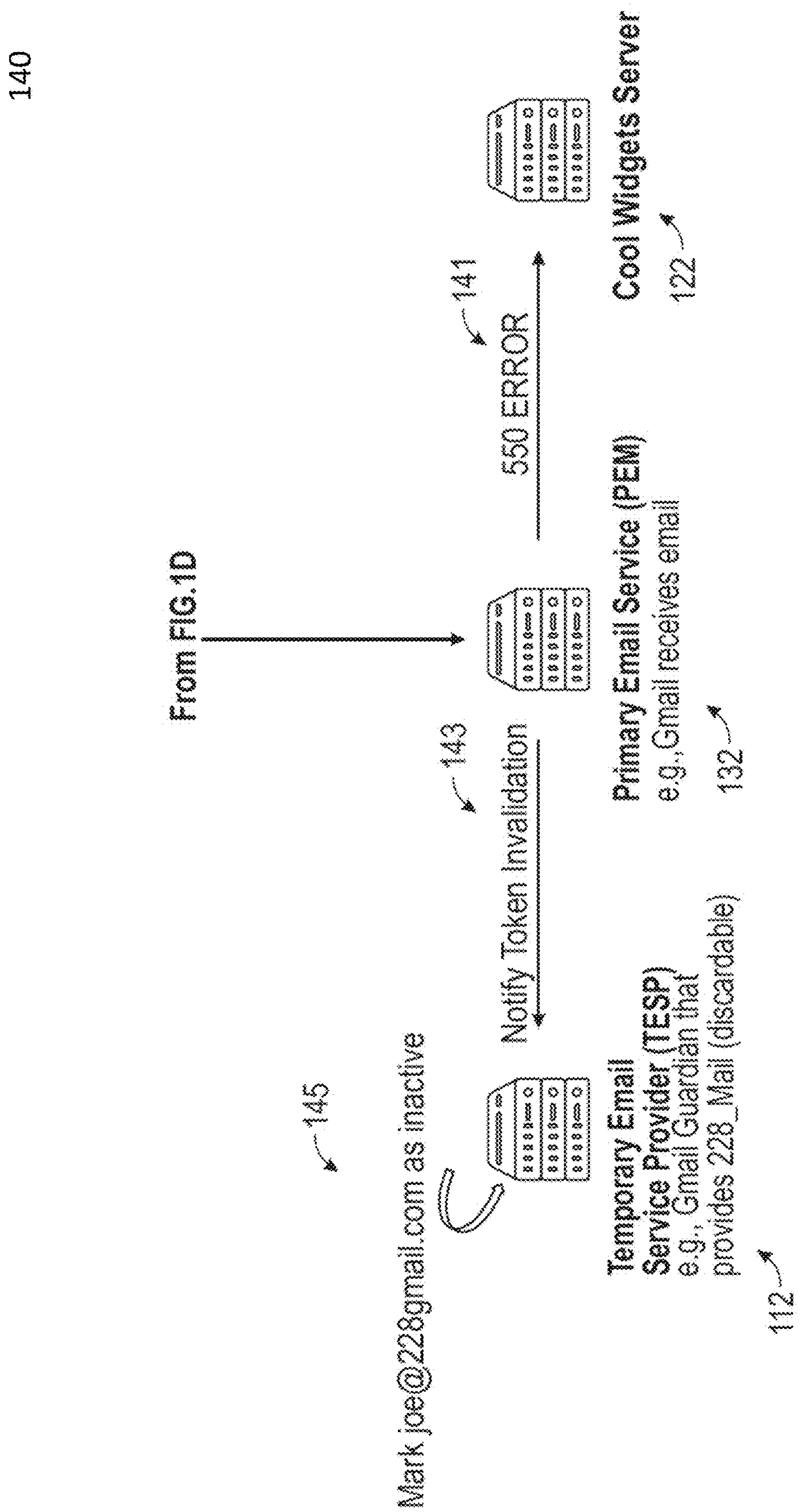
FIG. 1E shows an illustrative scenario in which the TESP inactivates the temporary email address upon receiving a notice of token invalidation from the PEM, in accordance with some embodiments of this disclosure.

In some embodiments, the TESP may receive a second email from the ESS. The TESP may modify the second email to include the token and forward the modified second email to the PEM of the user. The PEM may attempt a second validating of the token with the public key obtained from the at least one DNS server. For example, the second validating of the token may be accomplished by the PEM comparing the hash of the token that is computed locally by the PEM with a hash obtained by PEM by decrypting the signature with the public key received from the DNS server. In response to a failure of the second validating, the PEM may refrain from forwarding the second email to the PEM inbox of the user; and transmit a token invalidation notification to the mail server of the TESP that deactivates the temporary email address. FIG. 1E shows an illustrative scenario 140 in which the TESP inactivates the temporary email address upon receiving a notice of token invalidation from the PEM, in accordance with some embodiments of this disclosure. The Gmail PEM 132 transmits 141 a 550 SMTP error (email rejected) to the ESS Cool Widgets server 122 and transmits 143 a notification of token invalidation to the Gmail Guardian TESP 112. The Gmail Guardian TESP 112 deactivates 145 the temporary email joe@228mail.com. In some embodiments, the PEM may temporarily store the second email. The PEM may then transmit an approval request to the user device using the PEM requiring user input for approval. In response to an approval being received from the user device using the PEM to approve the second email, the PEM forwards the second email to the main inbox of the PEM. In response to an approval not being received from the user device using the PEM to approve the second email, the PEM may store the second email in a spam storage associated with the PEM.

In some embodiments, the usage limit criterion includes a number of emails that are allowed to be sent to the temporary email address. Upon a determination by the PEM that the email meets the usage limit criterion stored by the at least one DNS server is verified, the PEM may retrieve the number of emails that are allowed to be sent to the temporary email address from the DNS server. For example, the Gmail PEM may determine that one email has been sent to joe@228mail.com. The PEM may then determine that fewer emails were received via the temporary email address than the number of emails that are allowed to be sent to the temporary email address and cause, to be reduced, the number of emails that are allowed to be sent to the temporary email address. For example, if one email is sent and the number of emails allowed is set to five, then the PEM may update the allowed limit by decrementing the limit such that the new allowed limit is four sent emails (as one has been used).

In some embodiments, the system may maintain a database of trust level scores for email domains based on history of emails received from the email domains. In some embodiments, the database may be a separate network accessible storage that may be accessed by at least one of TESP or PEM. In other embodiments, the database may be part of at least one of the TESP or PEM. The system may retrieve, in the database, a trust level score for the ESS. The stored at least one usage limit criterion may be based on the retrieved trust level score. In some embodiments, the trust level score for the email sender server may be further based on at least one of a disapproved-list database or approved-list database. A disapproved-list database may be a collection of IP addresses, email addresses, domains, or URLs that are identified as sources of spam, malicious activity, or other unwanted behavior. An approved-list database may be a collection of IP addresses, email addresses, domains, or applications that are explicitly allowed to access a system or network and/or allowed to send emails. Unlike a disapproved-list database, which blocks known malicious entities, an approved-list database may permit only pre-approved entities.

In some embodiments, the trust level scores may include a plurality of levels (e.g., low trust, medium trust, and high trust). Each respective trust level score may have its own threshold level of trust based on a number of characteristics such as the frequency of emails received within a temporal period (e.g., number of emails received by website within a year), whether the website has previously been subject to a data breach (e.g., user emails and passwords were compromised by a hacker within the past year), and other similar types of characteristics that may measure trust in a website. In some embodiments, if the system determines the trust level score is low, the TESP may provide corresponding information for autofill. For example, if the website is sketchywidgets.com which has a determined trust level score of low, the TESP, in addition to generating a temporary email address, may also generate a temporary name (e.g., Rufus [fake name], instead of Joe [real name]) and/or other required information for requested fields. In another example, if the website is coolwidgets.com which has a determined trust level of medium, the TESP would generate a temporary email address but not generate further information for autofill.

In some embodiments, the TESP may generate and manage multiple temporary email addresses or profiles under different trust level tiers, enabling the user to select the degree of anonymity or personal information disclosure appropriate for each sign-in process. In some embodiments, the TESP may automate the selection of the trust level tier by integrating a website reputation-checking mechanism into the system. This reputation assessment can involve querying third-party reputation databases (e.g., approved-list or disapproved-list) or APIs, such as Google Safe Browsing or Web of Trust, to obtain a score or categorization of the website based on historical security incidents, user feedback, and content analysis. The system (e.g., any combination of TESP or third-party systems) may also validate the website's SSL/TLS certificate, checking for legitimacy through factors like certificate authority, expiration date, and domain match. Additional reputation factors may include domain age and registration information, where newly registered or anonymously owned domains are flagged as higher risk. The system may further analyze the content and behavior of the website, identifying anomalies such as unauthorized redirects, excessive data requests, or unusual script activity. As mentioned above, the system may cross-reference the website with maintained disapproved-lists and approved-lists ensures identification of known malicious or trusted domains. In some embodiments, the system may implement advanced risk assessment models using artificial intelligence and machine learning and may combine these data points to predict a real-time reputation score for the website. Based on this score, the system determines the appropriate trust level tier. For example, a low-risk website may receive a lower-tier profile consisting of only a temporary email address and a basic username, while a higher-risk website may trigger the generation of a higher-tier profile, which includes additional randomly generated personal information such as name, address, and date of birth.

In some embodiments, generating, by the TESP, the temporary email address for user registration of the user with an email sender server includes determining, from a plurality of eligible domain name having respective reputation scores, a lead domain name having a highest respective reputation score. The system may select the lead domain. For example, if the first domain name (e.g., coolwidgets.com) has a high reputation score by being on multiple approved-lists with no disapproved-lists, while the second domain name (e.g., sketchywidgets.com) has a low reputation score by being on multiple disapproved-lists with no approved-lists, the first domain name may be selected for the system. In some embodiments, the reputation score may be based on at least delivery success rate, bounce rates, approved-list status or disapproved-list status.

Figure 2:
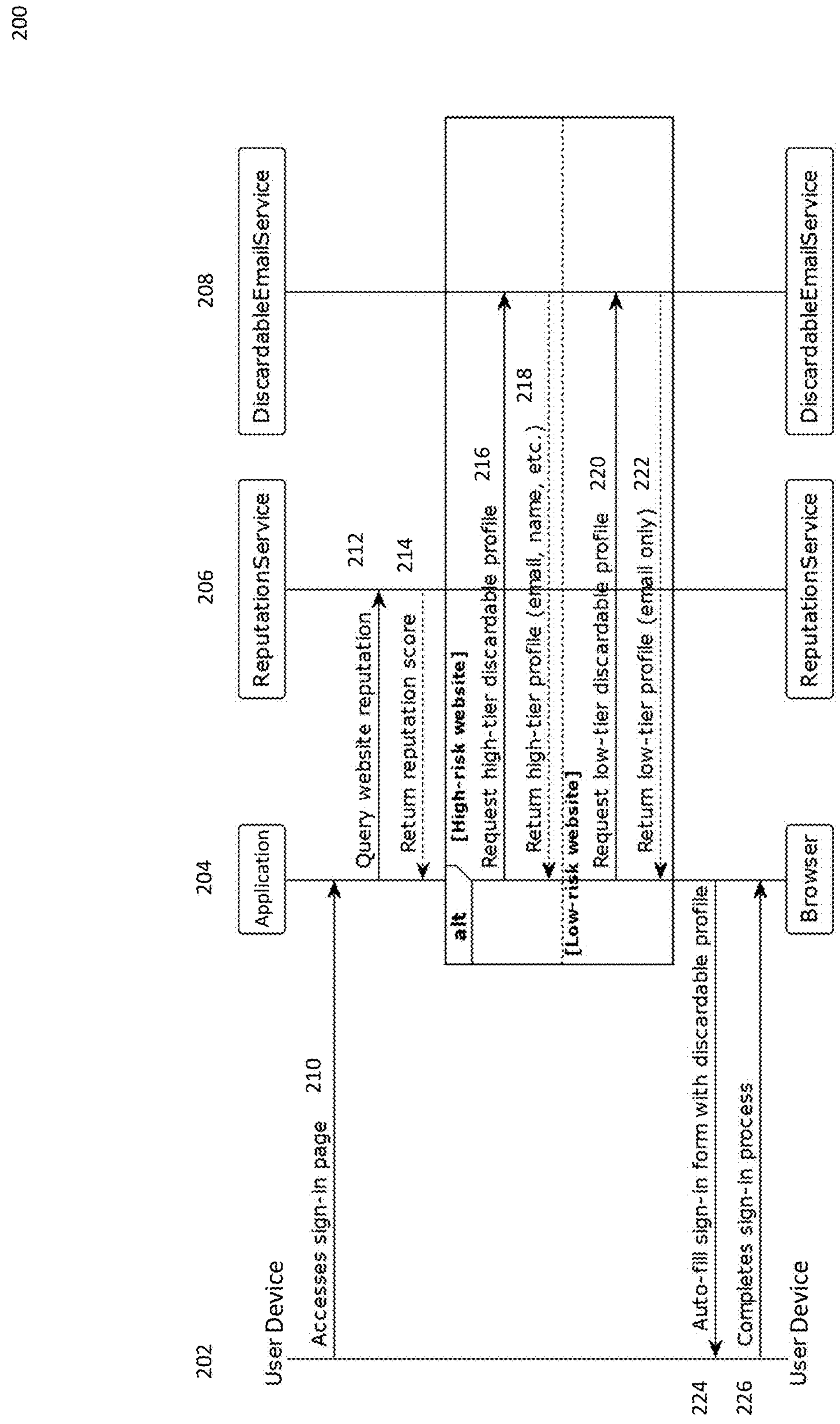
FIG. 2 is a sequence diagram in which the system provides a temporary email address based on a plurality of trust level tiers, in accordance with some embodiments of this disclosure.

FIG. 2 is a sequence diagram 200 in which the system provides a temporary email address based on a plurality of trust level tiers, in accordance with some embodiments of this disclosure. The sequence diagram includes a user device 202, an application 204 (e.g., browser, or thin-client GUI, or any application for accessing network data), a reputation service 206, and a discardable email service 208. At 210, the application 204 may receive a request from a user device 202 via user input to access a site sign-in page. The application 204 may then query a reputation service 206 for the site reputation 212 and receive the returned score 214. Based on the score for a high-risk site, the application 204 may then request a high-tier discardable profile, at 216, from the discardable email service 208 (e.g., similar to TESP 112 in FIG. 1A-D). The discardable email service 208 returns the high-tier profile at 218 to the application 204, where the high-tier profile includes email, name, etc. Based on the score for a low-risk website, the application 204 may then request a low-tier discardable profile, at 220, from the discardable email service 208 (e.g., similar to TESP 112 in FIG. 1A-D). The discardable email service 208 returns the low-tier profile at 222 to the application 204, where the low-tier profile includes email only. At 224, the application 204 may auto-fill the sign-in form with the discardable profile (e.g., similar to FIG. 1A at 106) and complete the sign-in process at 226.

In some embodiments, the system may implement domain pooling and rotation mechanism to further protect temporary email addresses from widespread detection or blocking. The system may maintain a pool of pre-registered domains, each configured to generate and host discardable email addresses. The system may select and manage these domains to ensure compliance with email service providers' policies and proper configuration, including DNS and MX records. The TESP may generate temporary email addresses that are dynamically allocated to domains from this pool based on predefined rules or algorithms. The TESP may perform allocation based on random selection, round-robin distribution, or load-balancing techniques to evenly distribute usage across the available domains. In some embodiments, the TESP may implement priority schema that may be given to domains with higher reputation metrics, ensuring that domains with better delivery rates and lower spam risks are used more frequently.

The system may periodically rotate domains in the pool by retiring certain domains and introducing new ones. Retired domains may be temporarily deactivated or removed permanently, depending on factors such as disapproved-list appearances or deteriorated reputations. For example, 228mail.com may be temporarily deactivated if it appears on multiple disapproved-list databases. To maintain the effectiveness of the pool, the system may continuously monitor the performance and reputation of each domain. For example, the system may monitor metrics such as delivery success rates, bounce rates, and disapproved-list status. The system may flag domains for problems, such as blocking by major email providers, and they can be temporarily paused or removed from the pool until their issues are resolved, or they are replaced. The domain pool may also be organized into groups tailored to specific use cases or regions. For instance, certain domains may be reserved for high-trust applications, while others may be optimized for regional compliance or user preferences. This grouping ensures that the domains align with the requirements of different services or user demographics. Additionally, the system may implement failover mechanisms to dynamically reallocate email addresses to other domains in the event of a domain becoming unavailable or compromised, ensuring seamless operation. To further obfuscate patterns and enhance protection, the system may employ techniques such as randomizing subdomains or periodically varying email prefixes. The system may receive user interface input from users that may also have the option to view or select preferred domains for specific use cases, such as choosing a domain with a neutral or professional name for business interactions.

Figure 3:
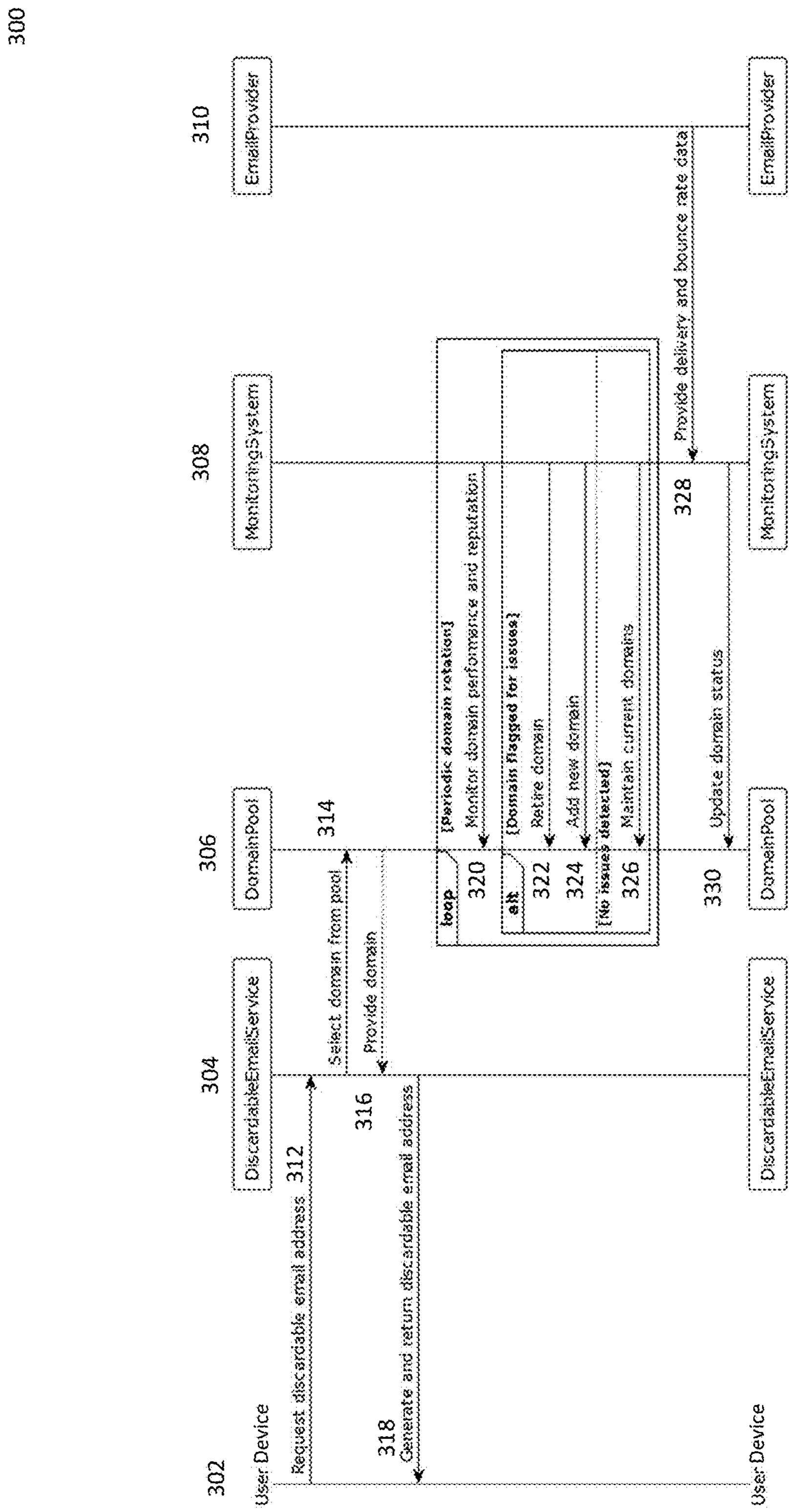
FIG. 3 is a sequence diagram in which the system implements domain pooling for generation of temporary email addresses, in accordance with some embodiments of this disclosure.

FIG. 3 is a sequence diagram 300 in which the system implements domain pooling for generation of temporary email addresses, in accordance with some embodiments of this disclosure. The sequence diagram includes a user device 302, a discardable email service 304 (e.g., a TESP), a domain pool 306, a monitoring system 308, and an email provider 310 (e.g., a PEM). The discardable email service 304 receives a request from a user device 302 for a discardable email address 312. At 314, the discardable email service 304 selects a domain from the domain pool 306 and receives the selection 316. At 318, the discardable email service 304 generates and returns the discardable email address to the user device 302. A monitoring system 308 monitors the domain performance and reputation 320 of the domain pool 306. In some embodiments, the monitoring system 308 transmits a command, to the domain pool 306, to retire the domain 322 (e.g., due to high levels of disapproved listing). In some embodiments, the monitoring system 308 transmits a command, to the domain pool 306, to add a new domain 324 (e.g., because the currently used domain is compromised). In some embodiments, the monitoring system 308 transmits a command, to the domain pool 306, to maintain the current domain 326 (e.g., if no issues are detected). The monitoring system 308 receives bounce rate data 328 from the email provider 310 and updates the domain status 330.

In some embodiments, the system provides real-time analytics and monitoring of each temporary email address or profile to detect suspicious activity and enhance user privacy and security. The system may be configured to ensure users may effectively use temporary email addresses without exposing their primary email addresses to potential risks or requiring constant manual intervention. The system includes an activity monitoring module that continuously tracks all interactions involving temporary email addresses. Metrics such as the number of emails received, forwarded, replied to, or deleted may be logged, along with metadata including the sender's domain, timestamps, subject lines, and email sizes. The system may store these data metrics securely and may utilize them for identifying potential threats, without analyzing the content of forwarded emails to maintain user privacy.

The system may implement an anomaly detection engine that processes the data collected by the monitoring module to identify patterns that deviate from normal usage. Examples of anomalies include a sudden surge of emails sent to a temporary email address (e.g., high frequency SPAM), which may indicate that the address has been leaked or shared, or an unusually high frequency of email forwarding to the primary inbox in a short period. Other examples of an anomaly may include large attachments, repeated messages from unexpected geographic locations, or emails containing suspicious keywords associated with phishing or scams. The anomaly detection engine relies on rule-based algorithms and adaptive statistical models to identify these anomalies while minimizing false positives. In some embodiments, the anomaly detection engine may implement large language models (LLM) and small language models (SLM) to identify these anomalies. In some embodiments, the system may implement thresholds for identifying abnormal behavior that adjust dynamically based on historical usage patterns of the discardable address. Upon detection of an anomaly, the system may utilize an incident response module to determine the appropriate action to protect the user's privacy and security. Depending on the severity and type of anomaly, the incident response module may temporarily deactivate the affected discardable email address to prevent further emails from reaching the user's primary inbox until the situation is reviewed. The incident response module may also flag the address for increased monitoring, applying stricter thresholds to detect further suspicious activity, or quarantine suspicious emails in a temporary holding queue, isolating them from the user's primary inbox and allowing for manual review.

The system may implement a user notification and feedback system to transmit notifications to user devices to keep users informed of any anomalies detected by the service. Notifications may be sent securely to the user's primary email or via the service's application, if available. These notifications may provide a concise description of the detected issue, such as "Unusual volume of emails detected for discardable address X" or "Suspicious activity from domain 228mail.com." The user is offered options to review the flagged activity through a web dashboard or application interface, which provides detailed logs of recent interactions. Notifications may also include actionable options, such as "Deactivate Address" or "Mark as Safe," allowing users to respond immediately to the detected anomaly.

Figure 4:
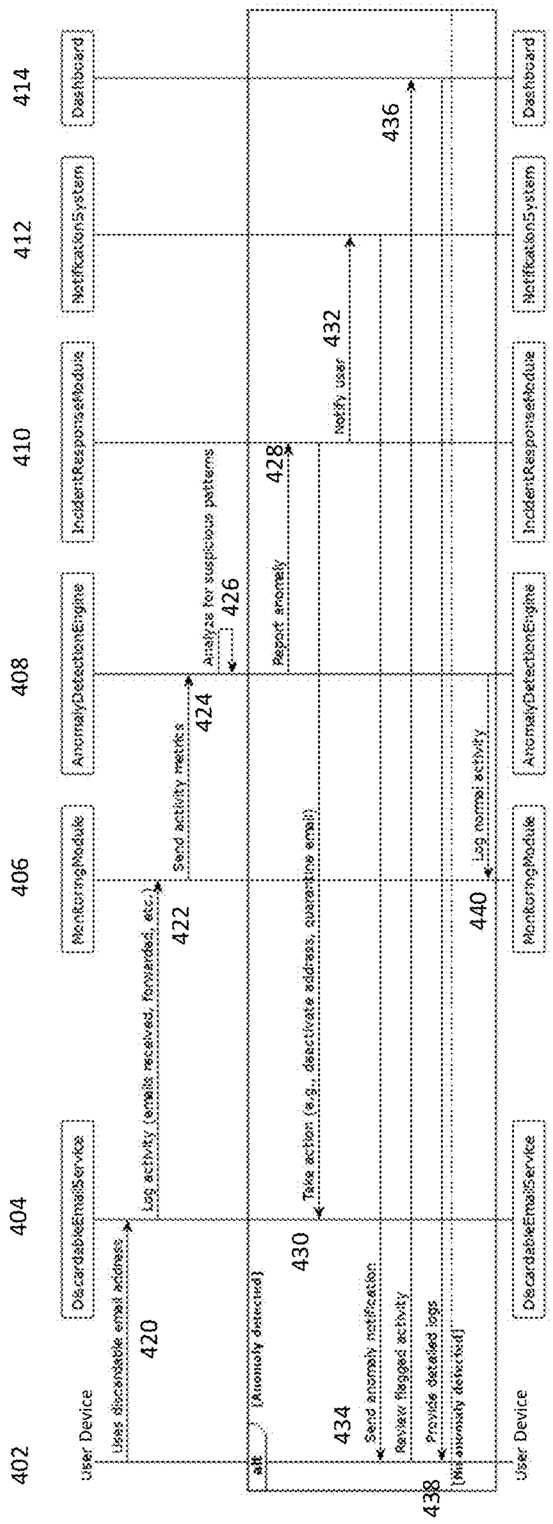
FIG. 4 is a sequence diagram in which the system monitors usage limit criterion associated with the temporary email address, in accordance with some embodiments of this disclosure.

FIG. 4 is a sequence diagram 400 in which the system monitors usage limit criterion associated with the temporary email address, in accordance with some embodiments of this disclosure. The sequence diagram includes a user device 402, a discardable email service 404 (e.g., a TESP), a monitoring module 406, an anomaly detection engine 408, an incident response module 410, a notification system 412, and a dashboard 414. The discardable email service 404 receives notification that a user device 402 has used a discardable email address 420, and logs the activity 422 with the monitoring module 406. The anomaly detection engine 408 receives activity metrics 424 from the monitoring module 406 and analyzes these metrics for suspicious patterns 426 (e.g., similar to FIG. 1D, where the PEM determines count limit is less than five at 136). If an anomaly is detected, the incident response module 410 receives 428 the reported anomaly from the anomaly detection engine 408 and notifies the user 432, via the notification system 412, sent to the user at 434. The dashboard 414 receives a flagged activity 436 from the user device 402 and provides detailed logs to the user at 438. If the scenario where no anomaly is detected, the anomaly detection engine 408 logs normal activity 440 with the monitoring module 406.

In some embodiments, the system may implement a group-sharing capability to allow for a temporary email address to be requested, shared, or transferred among a set of authorized users under a single primary account. The system enables the primary account owner to create and manage a group by inviting members, who authenticate their identities through secure methods such as their primary email addresses. Once the group is established, the configuration, including the list of group members, permissions, and shared temporary email addresses, is stored in the system's database. The primary account owner or authorized group members can request a temporary email address from the system. These addresses are designated as "group addresses" and are accessible to group members based on permissions set by the primary account owner. Permissions define the level of access for each member, such as viewing the address, using it to send or forward emails, or managing settings like forwarding rules and activity logs.

The system enforces access control to ensure that only authorized members can use or view the shared address. The system tracks the usage of shared temporary email addresses, recording details such as the member accessing the address, the action performed (e.g., email sent, received, or forwarded), and timestamps. These audit logs are accessible to the primary account owner through a secure dashboard, providing transparency and accountability for the shared addresses. If necessary, the primary account owner can revoke a specific member's access to a shared address, such as in cases of misuse or when a member leaves the group. Additionally, the owner can transfer ownership of the address to another member, granting them full control over the address.

Notifications are sent to group members regarding updates to the shared addresses, such as when a new address is added, permissions are modified, or access is revoked. These notifications are delivered securely via email, mobile app alerts, or through the group dashboard. Privacy safeguards ensure that members cannot view the primary email addresses or personal data of other group members, maintaining individual privacy within the group. Each member interacts with the shared discardable address as if it were their own, without visibility into the personal information of others.

Figure 5:
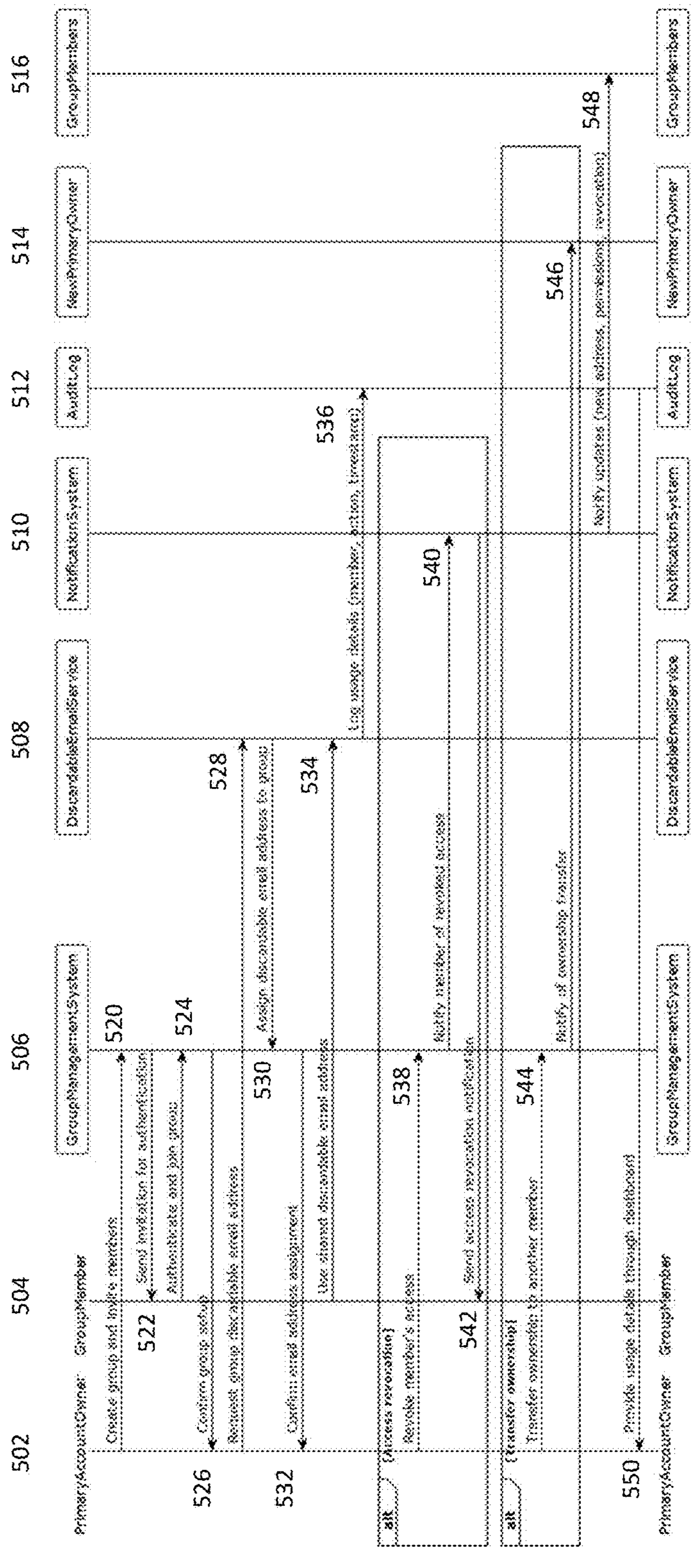
FIG. 5 is a sequence diagram in which the system provides for a temporary email address to be utilized by a plurality of PEM accounts, in accordance with some embodiments of this disclosure.

FIG. 5 is a sequence diagram 500 in which the system provides for a temporary email address to be utilized by a plurality of PEM accounts, in accordance with some embodiments of this disclosure. The sequence diagram includes a primary account owner 502, a group member 504, a group management system 506, a discardable email service 508, a notification system 510, an audit log 512, a new primary owner 514, and group members 516. The group management system 506 receives a request 520 from the primary account holder 502 to create a group and invite members. For example, similar to FIG. 1A-1D, Joe may have a family including a wife and a daughter that have their own respective accounts. Each of Joe, Joe's wife, and Joe's daughter may wish to purchase widgets from www.coolwidgets.com using their own respective accounts. The group management system 506 sends an invitation 522 to the group member 504 for authentication, which if authenticated, joins the group 524. Continuing with the example, the system may be configured to allow the user device associated with Joe's account (e.g., primary account holder) to transmit an invite to a second user device that is associated with Joe's wife's account and a third device that is associated with Joe's daughter's account. At 526, the group management system 506 confirms with the primary account holder 502 the group is set up. The primary account holder 502 requests a group discardable email address 528 from the discardable email service 508, which assigns the discardable email address to the group 530. Continuing with the example, each of Joe, Joe's wife, and Joe's daughter may use the single generated discardable email address. The group management system 506 confirms the group setup and requests group discardable email assignment 532 with the primary account holder 502. The group member 504 uses the shared discardable email address 534. At 536, the discardable email service logs usage of the group member, action and timestamp with the audit log 512. In the scenario where the access to the group is revoked, the primary account holder 502 revokes the group member's access 538 via the group management system 506. At 540, the group member 504 is notified via the notification system 510, which sends this notification 542 directly to the group member 504. In the scenario where there is a transfer of ownership of the group to another group member, then primary account holder 502 transfers ownership 544 to the group management system 506 which notifies the new primary owner 514 of the ownership transfer 546. At 548, the notification system 510 updates information (e.g., new address, permissions, and revocation) for all group members 516. At 550, the (old) primary account holder 502 may receive usage details of the group through a dashboard provided by the audit log 512.

In some embodiments, the system may implement short-lived multi-factor authentication tokens that are integrated with newly generated temporary email addresses to enhance their security and control. When a temporary email address is created by the TESP, a unique token may be generated and tied to the address, the user's primary email server or client, and the discardable email service's SMTP server. This token ensures that only authorized servers can send emails to the discardable address, preventing unauthorized sharing or misuse. The TESP may create the token alongside the temporary email address and includes attributes such as the associated temporary email address, the allowed number of email deliveries, the expiration time, and a cryptographic signature to ensure its authenticity. When the TESP generates the token, the token may be securely distributed to the discardable email service's SMTP server, which embeds the token into outgoing emails as part of the email headers. The user's primary email server or client validates incoming emails against the token, and optionally transmits to the user for transparency or manual management.

The DNS infrastructure may enable token validation by including an MX record in the discardable email service's domain that points to the service's SMTP server. This ensures that all emails sent to the discardable address are routed through the appropriate server. Additionally, the domain may contain a TXT record to provide validation details for the token. An example of the DNS configuration is as follows:

example-discard.com. IN MX 10 mail.example-discard-.com example-discard.com. IN TXT "v=discardable-token; k=publickey; t=5;

exp=20250117T120000Z"

In this configuration, v-discardable-token specifies the record type, k=publickey provides the public key for verifying the token's cryptographic signature, t=5 indicates the maximum number of email deliveries allowed, and exp=20250117T120000Z defines the token's expiration timestamp. When an email is sent to the temporary email address, the sender's email server may query the MX record for the domain and routes the email to the discardable email service's SMTP server. The discardable email service embeds the token in the email headers, such as:

X-Discardable-Token:

eyJhbGciOiJIUzIlNiIsInR5cCI6IkpXVCJ9.eyJhZGRy ZXNzIjoidXNlckBleGFtcGx1L mNvbSIsInVzZXNfYWxsb3dlZCI6NX0.s3cr3tT0k3n Upon receiving the email, the user's primary email server (e.g., PEM) or client may validate the token by checking the DNS TXT record of the discardable email service's domain for the public key and token constraints, verifying the cryptographic signature of the token to ensure it has not been tampered with, and ensuring the token matches the associated discardable address, has not expired, and has not exceeded the allowed usage count. If the token is valid, the email may be delivered to the user's inbox. If the token is invalid, expired, or overused, the user's email server may reject the email with a 550 SMTP error.

The PEM may notify the TESP mail server when a token becomes invalid. The temporary email service then marks the associated address as inactive and prevents further token embedding. The account holder of the PEM may be notified of the address deactivation and can choose to generate a new discardable address if needed. The token mechanism also includes features for renewal and manual control. If the PEM account holder needs to extend the lifespan of the temporary email address, a request may be sent for a new token through user interface input. This new token replaces the old one and reactivates the validation process.

Figure 6:
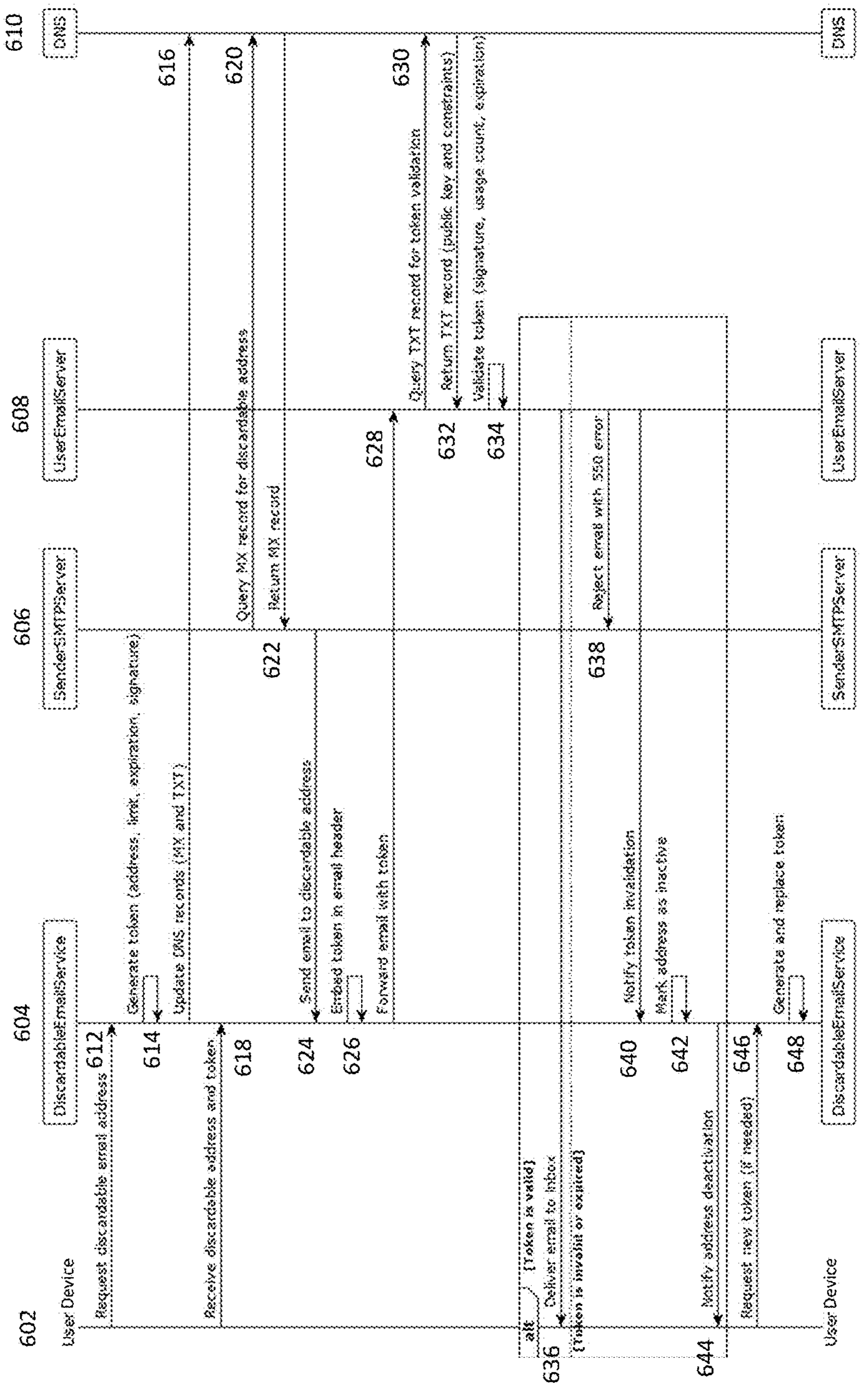
FIG. 6 is a sequence diagram in which the system implements token validation by token decryption using a public key, in accordance with some embodiments of this disclosure.

FIG. 6 is a sequence diagram 600 in which the system implements token validation by token decryption using a public key, in accordance with some embodiments of this disclosure. The sequence diagram includes a user device 602, a discardable email service 604 (e.g., a TESP), a sender SMTP server 606, a user email server (e.g., PEM) 608, and a domain name server (DNS) 610. The discardable email service 604 receives, from the user 602, a request for a discardable email address 612. At 614, the discardable email service 604 generates a token (e.g., address, limit, expiration, and signature) and updates the DNS records accordingly at 616 at the DNS 610. At 618, the discardable email service 604 receives, from the user device 602, the discardable email address and token. At 620, the sender SMTP server 606 queries the MX record for the discardable email address from the DNS 610 which is returned 622. At 624, the discardable email service 604 receives an email from the sender SMTP server 606, embeds the token in the email header 626, and then forwards at 628 the email with the token to the user email server 608. At 630, the user email server 608 queries a text record for token validation from the DNS 610, where the record is returned at 632 for validation 634 (e.g., similar to FIG. 1D, where the PEM receives token key information from DNS server 114 for token validation at 137). In the scenario that the token is valid, at 636, the user email server 608 delivers the email to the inbox of user device 602. In the scenario that the token is invalid, at 638, the user email server 608 rejects the email with a 550 SMTP error to the sender SMTP server, and notifies the discardable email service 604 of the token invalidation at 640. The discardable email service 604 deactivates the discardable email address 642 and notifies, at 644, to the user device 602 of the address deactivation. The discardable email service 604 may receive a new request 646 for a new token from user 602 that may be generated at 648.

In some embodiments, the system may implement unencrypted communication channels such as SMTP/POP3, Zero Knowledge Proof (ZKP) approaches may be implemented to ensure that an incoming server is authorized to send email to the discardable email address. Upon registration with an online service using a discardable email address, the system may generate a shared secret (e.g., pre-shared key (PSK)) and transmit this data to the online service outgoing email server. Upon establishing a communication with the incoming email server associated with the discardable email address, the incoming email server may request the outgoing email server associated with the online service to compute a probability of authentication via the shared secret associated with the discardable email address. This may ensure that the outgoing email server is the outgoing email server associated with the online service associated with the discardable email address.

In some embodiments, the incoming email server may accept a first email message to a temporary email address from the outgoing email server without requiring authorization. This may be useful in case a sign-in page asks for an email address verification. The system may accept more than one email to the discardable email address without authorization verification. The incoming email server may detect a change in email rates or content to the discardable email address and decide to implement authorization verification for all or a subset of subsequent emails to the discardable email address.

In some embodiments, the system may implement quick scanning of QR codes or domain certificates to trigger generation of a temporary email address on mobile devices or other limited-input systems. The system may implement this methodology where the registration and discardable email generation occur on different devices or on the same device. When the registration occurs on a different device, such as a smart TV displaying a sign-up screen, the system may generate for display a QR code on an external display. The QR code may contain encoded information, such as the requesting domain, registration context, and an endpoint for securely transmitting the generated discardable email address. A user device may receive the QR code using an I/O interface of their smartphone, or another device running an application. Upon scanning, the application communicates with the temporary email service, generates a temporary email address, and may transmit it to the designated endpoint provided in the QR code. The smart TV may then automatically populate the email field on the registration form with the discardable address. In cases where direct transmission is not supported, the application displays the generated address, allowing the user input via a user interface for manual entry on the external display.

In some embodiments, where the registration process occurs on the same device, instead of displaying a QR code, the system may generate for display a registration page including a "Generate Temporary Email" button or similar interactive element. Receiving input selection of this button triggers an API call to the temporary email service, which generates a temporary address and inserts it directly into the email field of the registration form. The discardable email service may validate the registration page's domain or certificate before generating the address to ensure the request is legitimate and secure.

The system may also use browser or app integration for seamless functionality. For example, if the user is registering on a compatible browser or within an application provided by the discardable email service, the software may detect the registration form and offer to auto-generate a temporary email address. This address is then inserted directly into the appropriate field without requiring user input.

In situations where QR codes or buttons are not feasible, the system may generate for display unique one-time-use links embedded in the registration page that may trigger temporary email generation. Receiving input of clicking the link transmits a request to the discardable email service which may be associated with the browser such as Safari (when within an Apple ecosystem), which validates the domain and securely returns a temporary email address. The service may either display the address to the user for manual entry or insert it into the form directly if supported by the registration page.

In some embodiments, generating, by the TESP, the temporary email address for user registration of the user with an email sender server includes receiving image data associated with a scanned matrix barcode (e.g., QR code), wherein the image data comprises an indicator for the ESS. In response to receiving the image data comprising the indicator for the ESS, the TESP may then generate the temporary email address for user registration of the user with the ESS.

Figure 7:
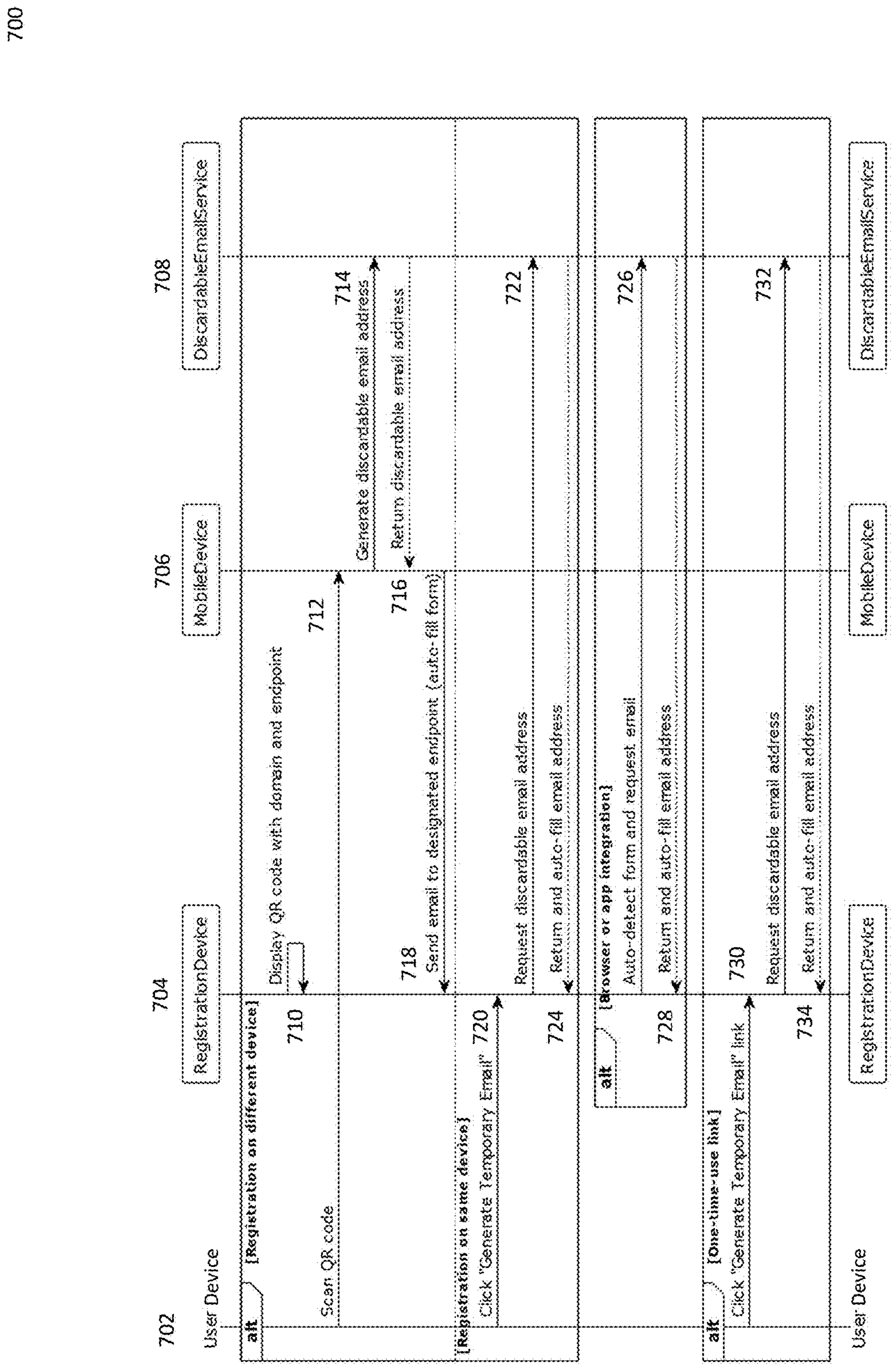
FIG. 7 is a sequence diagram in which the system generates a temporary email address upon scanning of a QR code, in accordance with some embodiments of this disclosure.

FIG. 7 is a sequence diagram 700 in which the system generates a temporary email address upon scanning of a QR code, in accordance with some embodiments of this disclosure. The sequence diagram includes a user device 702, a registration device 704, a mobile device 706, and a discardable email service 708 (e.g., a TESP). At 710, a registration device 704 displays a QR code with a domain and endpoint. The mobile device 706 receives a scanned QR code 712 from user device 702, and generates a discardable email address 714 that is returned 716 from the discardable email service 708 (e.g., similar to FIG. 1B, where TESP generates temporary email at 113). At 718, the registration device 704 receives an email from the mobile device 706 with an autofill form (e.g., similar to FIG. 1A at 106). In scenarios where registration is on the same device, the registration device 704 receives input from user device 702 to "generate a temporary email" 720 and requests the discardable email address 722, which is returned 724 from the discardable email address service 708. In scenarios where there is browser or in-app integration, the registration device 704 automatically detects form and requests the discardable email address 726 from the discardable email service 708 which is returned 728. In scenarios where there is a one-time-use link, the registration device 704 receives input from user device 702 to "generate temporary email" link 730, and requests the discardable email address 732, which is returned 734 from the discardable email service 708 and auto-fills the form.

In some embodiments, the system may monitor for data breaches. Upon detection of a breach associated with a discardable email address, the system may automatically mark the discardable email address as compromised and revoke it (e.g., delete the alias associated with the compromised discardable email address). The system may then generate a new discardable email address or a new discardable profile associated with a new discardable email address and update all accounts using the compromised discardable email address with the new discardable email address or the new discardable profile. The system may also notify the user associated with the discardable email address that a change was made to the sign-in credential for the websites using the compromised discardable email address. The system may also update the risk-level of the online services using the compromised discardable email address to further protect the user of another breach at the same online service. Since discardable email addresses may be used individually for each website, a data breach impacting one discardable email address may be directly traced back to a breached online service. If continuing to use the online service is required (such as for a paid service like Netflix™ or a necessary service like Uber™), the system may generate new credentials. In some embodiments, the system may receive an indication of a data breach associated with the ESS. Based on the indication of the data breach, the system may invalidate the temporary email address and refrain from processing any emails directed to the invalidated temporary email address.

In some embodiments, the system may offer single sign-on (SSO) such as "login with Facebook™" or "login with Google™". The SSO target (e.g., Facebook or Google) may implement the disclosed system by automatically generating a temporary email address it will share with the online service in place of the primary email address used to log into the SSO target. The SSO target may keep track of the association between the discardable email address and the online service. For example, if the system implements OAUTH2, upon the user entering credentials using SSO, the system may transmit an authorization token by the SSO target to the online service server. When the online service server uses the authorization token to request user data, the SSO target may generate a temporary email address and transmit it to the online service server in place of the primary email address used for SSO.

In some embodiments, generating, by the TESP, the temporary email address for user registration of the user with an email sender server includes receiving a confirmation of authentication with a single sign-on service associated with the PEM. In response to receiving the confirmation of authentication with the single sign-on service associated with the PEM, the TESP may then generate the temporary email address for user registration of the user. In some embodiments, the TESP is a module of the PEM.

Figure 8:
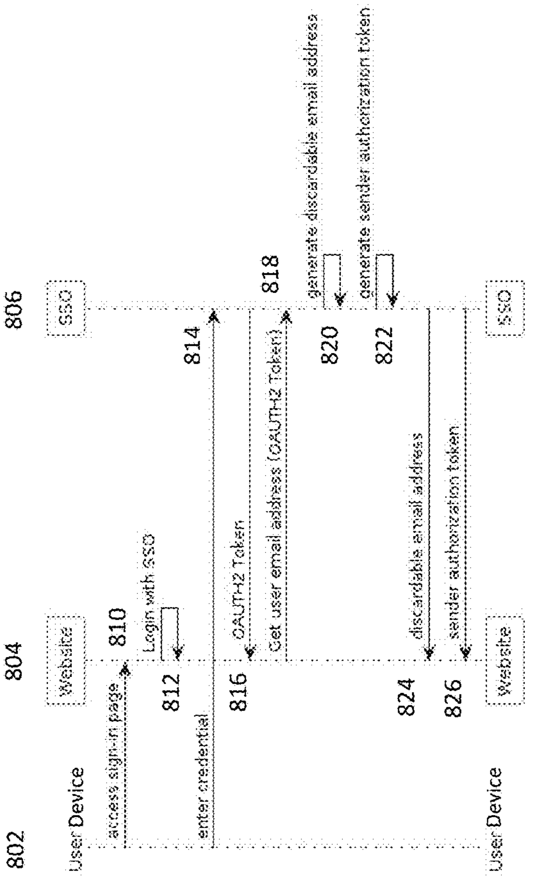
FIG. 8 is a sequence diagram in which the system generates a temporary email address upon authentication of a single sign-on service, in accordance with some embodiments of this disclosure.

FIG. 8 is a sequence diagram 800 in which the system generates a temporary email address upon authentication of a single sign-on service, in accordance with some embodiments of this disclosure. The sequence diagram includes a user device 802, a website 804, and a SSO 806. At 810, the website 804 may receive a request to access a sign-in page from the user device 802. At 812, the website 804 may login with SSO. The SSO 806 receives the credential 814 from user 802 and transmits the OAUTH2 token 816 to the website 804. At 818, the SSO 806 retrieves the user email address utilizing the OAUTH2 token and generates the discardable email address 820 and generates a sender authorization token 822. The SSO 806 transmits both the discardable email address 824 and send authorization token 826 to the website 804.

Figure 9:
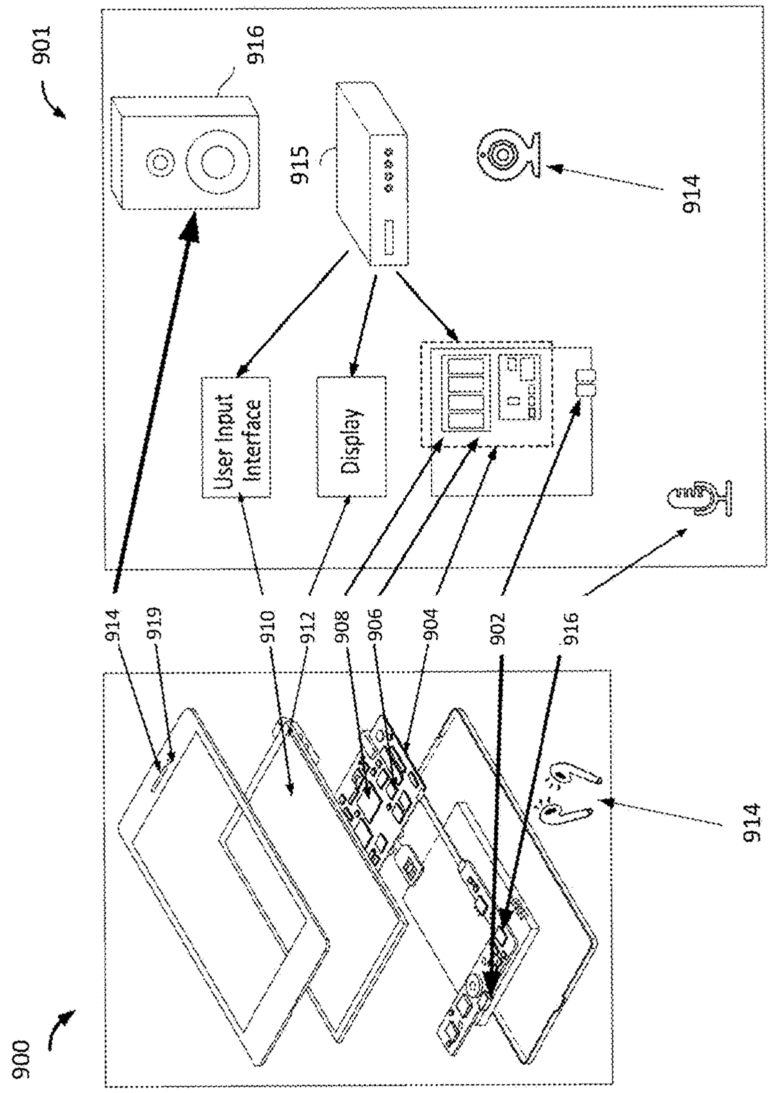
FIG. 9 shows illustrative user equipment devices, in accordance with some embodiments of this disclosure.
Figure 10:
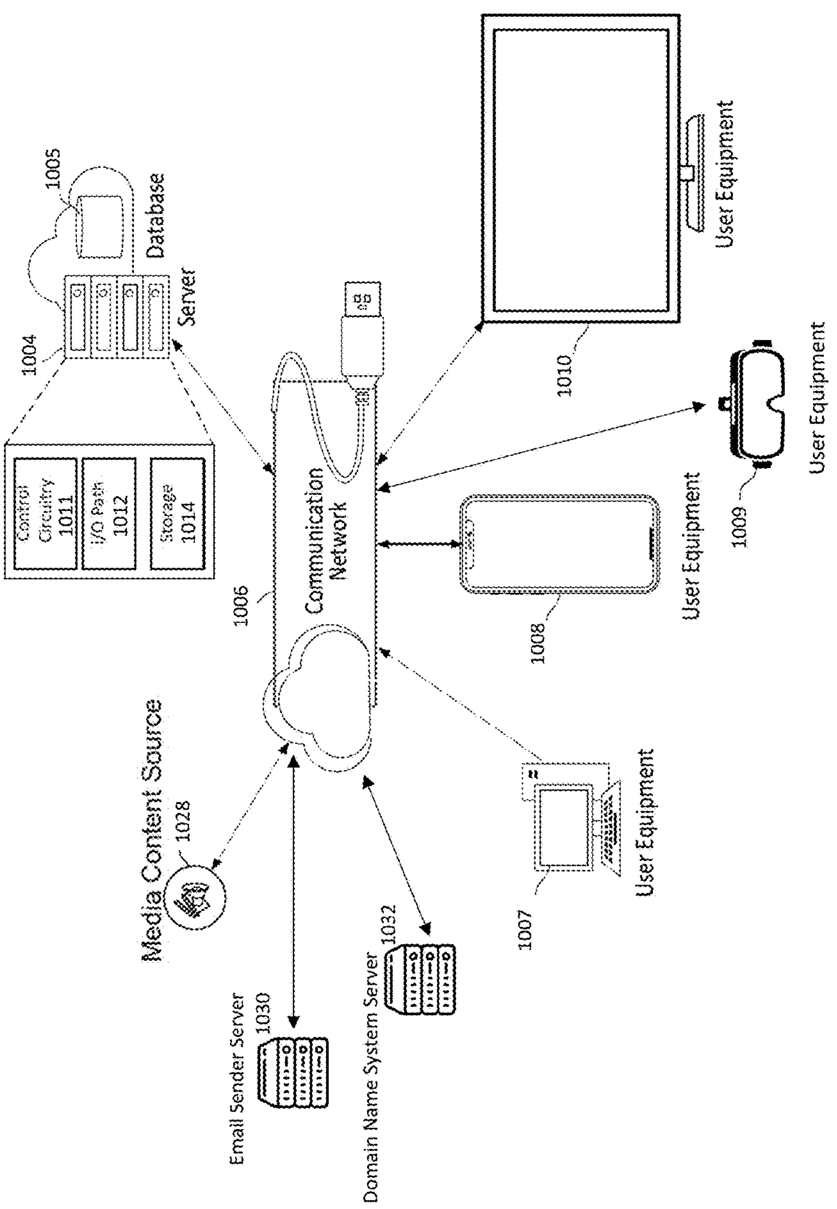
FIG. 10 shows illustrative systems, in accordance with some embodiments of this disclosure.

FIGS. 9-10 describe illustrative devices, systems, servers, and related hardware for a media application for efficient navigation of a plurality of media assets and for playing post-credit content in media assets by overriding play-next logic, in accordance with some embodiments of this disclosure. FIG. 9 shows generalized embodiments of illustrative user devices 900 and 901. For example, user equipment device 900 may be a smartphone device, a tablet, smart glasses, a virtual reality or augmented reality device (e.g., AR goggles, AR headset, AR implemented via smartphone, tablet, or computer), or any other suitable device capable of consuming media assets and capable of transmitting and receiving data over a communication network. In another example, user equipment device 901 may be a user television equipment system or device. User television equipment device 901 may include set-top box 915. Set-top box 915 may be communicatively connected to microphone 916, audio output equipment (e.g., speaker or headphones 914), and display 912. In some embodiments, microphone 916 may receive audio corresponding to a voice of a user, e.g., a voice command. In some embodiments, display 912 may be a television display or a computer display. In some embodiments, set-top box 915 may be communicatively connected to user input interface 910. In some embodiments, user input interface 910 may be a remote control device. Set-top box 915 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment devices are discussed below in connection with FIG. 10. In some embodiments, device 900 may comprise any suitable number of sensors, as well as a GPS module (e.g., in communication with one or more servers and/or cell towers and/or satellites) to ascertain a location of device 900.

Each one of user equipment device 900 and user equipment device 901 may receive content and data via input/output (I/O) path 902. I/O path 902 may provide content (e.g., broadcast programming, on-demand programming, Internet content, content available over a local area network (LAN) or wide area network (WAN), and/or other content) and data to control circuitry 904, which may comprise processing circuitry 906 and storage 908. Control circuitry 904 may be used to send and receive commands, requests, and other suitable data using I/O path 902, which may comprise I/O circuitry. I/O path 902 may connect control circuitry 904 (and specifically processing circuitry 906) to one or more communications paths (described below). I/O functions may be provided by one or more of these communications paths, but are shown as a single path in FIG. 10 to avoid overcomplicating the drawing. While set-top box 915 is shown in FIG. 10 for illustration, any suitable computing device having processing circuitry, control circuitry, and storage may be used in accordance with the present disclosure. For example, set-top box 915 may be replaced by, or complemented by, a personal computer (e.g., a notebook, a laptop, a desktop), a smartphone (e.g., device 900), a tablet, a network-based server hosting a user-accessible user device, a non-user-owned device, any other suitable device, or any combination thereof.

Control circuitry 904 may be based on any suitable control circuitry such as processing circuitry 906. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 904 executes instructions for the Media application stored in memory (e.g., storage 908). Specifically, control circuitry 904 may be instructed by the Media application to perform the functions discussed above and below. In some implementations, processing or actions performed by control circuitry 904 may be based on instructions received from the Media application.

In client/server-based embodiments, control circuitry 904 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 10, the instructions may be stored in storage 908 and executed by control circuitry 904 of a device 900.

In some embodiments, the media application may be a client/server application where only the client application resides on device 900, and a server application resides on an external server (e.g., server 1004). For example, the media application may be implemented partially as a client application on control circuitry 904 of device 900 and partially on server 1004 as a server application running on control circuitry 1011. Server 1004 may be a part of a local area network with one or more of devices 900 or may be part of a cloud computing environment accessed via the internet. In a cloud computing environment, various types of computing services for performing searches on the internet or informational databases, providing storage (e.g., for a database 1005) or parsing data are provided by a collection of network-accessible computing and storage resources (e.g., server 1004), referred to as "the cloud." Device 900 may be a cloud client that relies on the cloud computing capabilities from server 1004 to determine whether processing should be offloaded and facilitate such offloading. When executed by control circuitry 904 or 1011, the media application may instruct control circuitry 904 or 1011 circuitry to perform processing tasks for the user device and facilitate a media consumption session integrated with social network services. The client application may instruct control circuitry 904 to determine whether processing should be offloaded.

Control circuitry 904 may include communications circuitry suitable for communicating with a server, social network service, a table or database server, or other networks or servers. The instructions for carrying out the above-mentioned functionality may be stored on a server (which is described in more detail in connection with FIG. 10).

Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 10). In addition, communications circuitry may include circuitry that enables peer-to-peer communication of user equipment devices, or communication of user equipment devices in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media application data described above. Nonvolatile memory may also be used (e.g., to launch a boot-up routine and other instructions). Cloud-based storage may be used to supplement storage 908 or instead of storage 908.

Control circuitry 904 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 904 may also include scaler circuitry for upconverting and down converting content into the preferred output format of user equipment 900. Control circuitry 904 may also include digital-to-analog converter circuitry and analog-to-digital converter circuitry for converting between digital and analog signals. The tuning and encoding circuitry may be used by user equipment device 900, 901 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment device 900, the tuning and encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of user equipment device 900 and user equipment device 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 915.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of device 900 and equipment 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 916 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The media application may be implemented using any suitable architecture. For example, it may be a stand-alone application wholly-implemented on each one of user equipment device 900 and user equipment device 901. In such an approach, instructions of the application may be stored locally (e.g., in storage 908), and data for use by the application is downloaded on a periodic basis (e.g., from an out-of-band feed, from an Internet resource, or using another suitable approach). Control circuitry 904 may retrieve instructions of the application from storage 908 and process the instructions to provide media consumption and social network interaction functionality and generate any of the displays discussed herein. Based on the processed instructions, control circuitry 904 may determine what action to perform when input is received from user input interface 910. For example, movement of a cursor on a display up/down may be indicated by the processed instructions when user input interface 910 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, participation data from a media application and social network profile. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the media application is a client/server-based application. Data for use by a thick or thin client implemented on each one of user equipment device 900 and user equipment device 901 may be retrieved on-demand by issuing requests to a server remote to each one of user equipment device 900 and user equipment device 901. For example, the remote server may store the instructions for the application in a storage device. The remote server may process the stored instructions using circuitry (e.g., control circuitry 904) and generate the displays discussed above and below. The user device may receive the displays generated by the remote server and may display the content of the displays locally on device 900. This way, the processing of the instructions is performed remotely by the server while the resulting displays (e.g., that may include text, a keyboard, or other visuals) are provided locally on device 900. Device 900 may receive inputs from the user via input interface 910 and transmit those inputs to the remote server for processing and generating the corresponding displays. For example, device 900 may transmit a communication to the remote server indicating that an up/down button was selected via input interface 910. The remote server may process instructions in accordance with that input and generate a display of the application corresponding to the input (e.g., a display that moves a cursor up/down). The generated display may then be transmitted to device 900 for presentation to the user.

In some embodiments, the media application may be downloaded and interpreted or otherwise run by an interpreter or virtual machine (run by control circuitry 904). In some embodiments, the media application may be encoded in the ETV Binary Interchange Format (EBIF), received by control circuitry 904 as part of a suitable feed, and interpreted by a user agent running on control circuitry 904. For example, the media application may be an EBIF application. In some embodiments, the media application may be defined by a series of JAVA-based files that are received and run by a local virtual machine or other suitable middleware executed by control circuitry 904. In some of such embodiments (e.g., those employing MPEG-2 or other digital media encoding schemes), the media application may be, for example, encoded and transmitted in an MPEG-2 object carousel with the MPEG audio and video packets of a program.

FIG. 10 is a diagram of an illustrative system 1000, in accordance with some embodiments of this disclosure. User equipment devices 1007, 1008, 1009, 1010 (e.g., user device 102 of FIG. 1; devices or any other suitable devices, or any combination thereof) may be coupled to communication network 1006. Communication network 1006 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 1006) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the user devices may be provided by one or more of these communications paths but are shown as a single path in FIG. 10 to avoid overcomplicating the drawing. In some embodiments, an email sender server 1030 is communicatively coupled, via the communication network 1006, to server 1004. In some embodiments, a domain name system server 1032 is communicatively coupled, via the communication network 1006, to server 1004.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 1002-11x, etc.), or other short-range communication via wired or wireless paths. The user equipment devices may also communicate with each other directly through an indirect path via communication network 1006.

System 1000 may comprise media content source 1002, one or more servers 1004, and one or more social network services. In some embodiments, the media application may be executed at one or more of control circuitry 1011 of server 1004 (and/or control circuitry of user equipment devices 1007, 1008, 1009, 1010. This is similar to FIG. 1 wherein the content feed server 110 may be implemented as server 1004 and Content Provider Service Server 114 may be implemented as media content source 1002.

In some embodiments, server 1004 may include control circuitry 1011 and storage 1014 (e.g., RAM, ROM, Hard Disk, Removable Disk, etc.). Instructions for the media application may be stored in storage 1014. In some embodiments, the media application, via control circuitry, may execute functions outlined in FIGS. 1-5. Storage 1014 may store one or more databases. Server 1004 may also include an input/output path 1012. I/O path 1012 may provide media consumption data, social media data, device information, or other data, over a local area network (LAN) or wide area network (WAN), and/or other content and data to control circuitry 1011, which may include processing circuitry, and storage 1014. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths. I/O path 1012 may comprise I/O circuitry.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1011 executes instructions for an emulation system application stored in memory (e.g., the storage 1014). Memory may be an electronic storage device provided as storage 1014 that is part of control circuitry 1011.

Figure 11:
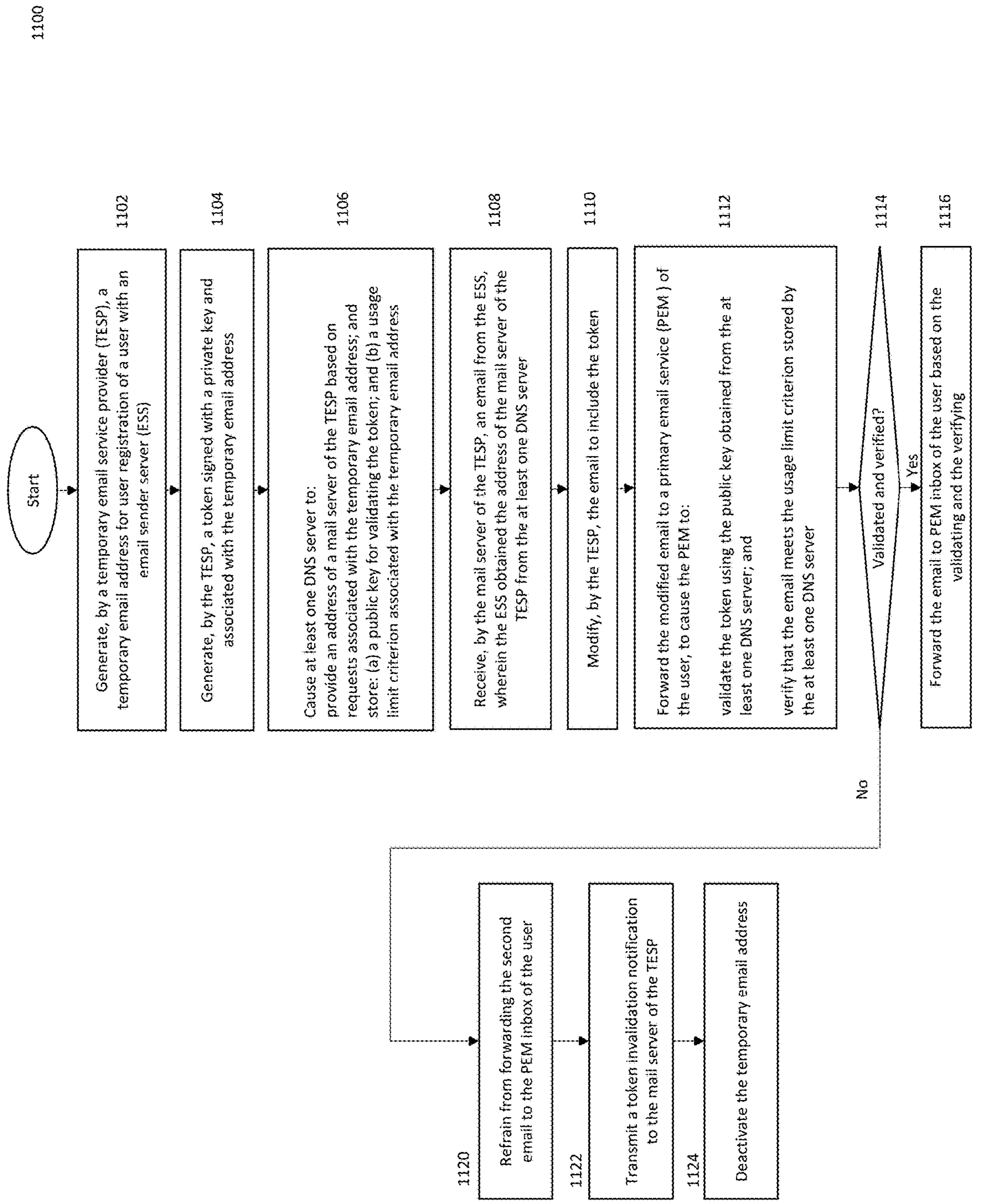
FIG. 11 is a flowchart of a detailed illustrative process for forwarding an email to a PEM inbox of a user based on validating a token and verifying usage limit criterion, in accordance with some embodiments of this disclosure.

FIG. 11 is a flowchart of a detailed illustrative process for forwarding an email to a PEM inbox of a user based on validating a token and verifying usage limit criterion, in accordance with some embodiments of this disclosure. In various embodiments, the individual steps of process 1100 may be implemented by one or more components of the devices and systems of FIGS. 1-10. Although the present disclosure may describe certain steps of process 1100 (and of other processes described herein) as being implemented by certain components of the devices and systems of FIGS. 1-10, this is for purposes of illustration only, and it should be understood that other components of the devices and systems of FIGS. 1-10 may implement those steps instead.

At 1102, the temporary email service provider (TESP), via a control circuitry (e.g., control circuitry 1011 of FIG. 10), generates, a temporary email address for user registration of a user with an email sender server (ESS). The TESP may interface with the ESS via an I/O path (e.g., I/O path 1012) over a communication network (e.g., communication network 1006). In some embodiments, the TESP may be a server (e.g., server 1004 of FIG. 10). In some embodiments, the ESS may be an email sender server (e.g., email sender server 1030 of FIG. 10).

At 1104, the TESP, via a control circuitry, generates a token for future cryptographic operations with a private key and associated with the temporary email address. At 1106, the TESP, via a control circuitry, causes at least one DNS server to be configured to provide an address of a mail server of the TESP based on requests associated with the temporary email address and store (a) a public key for decrypting the token and (b) at least one usage limit criterion associated with the temporary email address. The TESP may interface (e.g., by transmitting messages) with the DNS server via an I/O path (e.g., I/O path 1012) over a communication network (e.g., communication network 1006). In some embodiments, the DNS server may be a domain name system server (e.g., domain name system server 1032 of FIG. 10).

At 1108, the TESP, via a control circuitry, receives, by the mail server of the TESP, an email from the ESS. The ESS obtained the address of the mail server of the TESP from the at least one DNS server. The TESP may receive the email from the ESS via an I/O path (e.g., I/O path 1012) over a communication network (e.g., communication network 1006).

At 1110, the TESP, via a control circuitry, modifies the email to include the token. In some embodiments, a cryptographic operation is applied to the token. For example, the token may be cryptographically signed using a private key. In other embodiments, the token may be encrypted with a private key (e.g., as a form of a signature). In yet other additional embodiments, the token may be hashed and the resulting hash may be salted and encrypted using the private key as a form of a signature.

At 1112, the TESP, via a control circuitry, forwards the modified email to a primary email service (PEM) of the user, to cause the PEM to validate the token by using the public key obtained from the at least one DNS server and verify that the email meets the usage limit criterion stored by the at least one DNS server. For example, validating the token may be accomplished by the PEM comparing hash of token that is computed locally by the PEM with a hash obtained by PEM decrypting the signature with the public key received from the DNS server. The TESP may interface with the PEM via an I/O path (e.g., I/O path 1012) over a communication network (e.g., communication network 1006). If, at 1114, the TESP has not validated the token by decrypting the token with the public key obtained from the at least one DNS server or has not verified that the email meets the usage limit criterion stored by the at least one DNS server, the process proceeds to 1120.

At 1120, the TESP, via a control circuitry, refrains from forwarding the second email to the PEM inbox of the user. At 1122, the PEM, via a control circuitry, transmits a token invalidation notification to the mail server of the TESP. At 1124, the PEM, via a control circuitry, deactivates the temporary email address.

If, at 1114, the TESP has validated the token by decrypting the token with the public key obtained from the at least one DNS server and has verified that the email meets the usage limit criterion stored by the at least one DNS server, the process proceeds to 1116. At 1116, the PEM, via a control circuitry, forwards the email to PEM inbox of the user based on the validating and the verifying.

The processes discussed above are intended to be illustrative and not limiting. One skilled in the art would appreciate that the steps of the processes discussed herein may be omitted, modified, combined and/or rearranged, and any additional steps may be performed without departing from the scope of the disclosure. More generally, the above disclosure is meant to be illustrative and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

generating, by a temporary email service provider (TESP), a temporary email address for user registration of a user with an email sender server (ESS);

generating, by the TESP, a token signed with a private key and associated with the temporary email address;

causing at least one domain name server (DNS) server to:

provide an address of a mail server of the TESP based on one or more requests associated with the temporary email address;

store: a) a public key for validating the token; and b) a usage limit criterion associated with the temporary email address;

receiving, by the mail server of the TESP, an email from the ESS, wherein the ESS obtained the address of the mail server of the TESP from the at least one DNS server;

modifying, by the TESP, the email to include the token;

forwarding the modified email to a primary email service (PEM) of the user, to cause the PEM to:

validate the token using the public key obtained from the at least one DNS server;

verify that the email meets the usage limit criterion; and forward the email to a PEM inbox of the user based on the validating and the verifying.

2. The method of claim 1, wherein the email is a first email, and wherein the method further comprises:

receiving, by the mail server of the TESP, a second email from the ESS;

modifying the second email to include the token;

forwarding the modified second email to the PEM of the user, to cause the PEM to:

attempt a second validating of the token by decrypting the token with the public key obtained from the at least one DNS server; and in response to a failure of the second validating:

refrain from forwarding the second email to the PEM inbox of the user; and transmit a token invalidation notification to the mail server of the TESP;

deactivating the temporary email address.

3. The method of claim 1, wherein the usage limit criterion comprises a number of emails that are allowed to be sent to the temporary email address;

wherein the verifying that the email meets the usage limit criterion comprises:

retrieving, from the DNS server, the number of emails that are allowed to be sent to the temporary email address;

determining that fewer emails were received via the temporary email address than the number of emails that are allowed to be sent to the temporary email address;

causing, to be reduced, the number of emails that are allowed to be sent to the temporary email address.

4. The method of claim 1, further comprising:

maintaining a database of trust level scores for email domains based on history of emails received from the email domains;

retrieving, from the database, a trust level score for the ESS; and wherein the stored usage limit criterion is based on the retrieved trust level score.

5. The method of claim 4, wherein the trust level score for the ESS is further based on at least one of a disapproved-list database or an approved-list database.

6. The method of claim 1, further comprising:

receiving an indication of a data breach associated with the ESS;

based on the indication of the data breach:

invalidating the temporary email address; and refraining from processing emails directed to the invalidated temporary email address.

7. The method of claim 1, wherein the generating, by the TESP, the temporary email address for user registration of the user with an email sender server comprises:

determining, from a plurality of eligible domain names associated with the TESP having respective reputation scores, a lead domain name having a highest respective reputation score; and selecting the lead domain name.

8. The method of claim 7, wherein the respective reputation scores are determined based on at least one of delivery success rate, bounce rates, approved-list status or disapproved-list status.

9. The method of claim 1, wherein the generating, by the TESP, the temporary email address for user registration of the user with an email sender server comprises:

receiving image data associated with a scanned matrix barcode, wherein the image data comprises an indicator for the ESS; and in response to receiving the image data comprising the indicator for the ESS, generating, by the TESP, the temporary email address for user registration of the user with the ESS.

10. The method of claim 1, wherein the generating, by the TESP, the temporary email address for user registration of the user with an email sender server comprises:

receiving a confirmation of authentication with a single sign-on service associated with the PEM;

in response to receiving the confirmation of authentication with the single sign-on service associated with the PEM, generating, by the TESP, the temporary email address for user registration of the user, wherein the TESP is a module of the PEM.

11. A system comprising:

control circuitry configured to:

generate, by a temporary email service provider (TESP), a temporary email address for user registration of a user with an email sender server (ESS);

generate, by the TESP, a token signed with a private key and associated with the temporary email address;

causing at least one domain name server (DNS) server to:

provide an address of a mail server of the TESP based on one or more requests associated with the temporary email address;

store: a) a public key for validating the token; and b) a usage limit criterion associated with the temporary email address;

receive, by the mail server of the TESP, an email from the ESS, wherein the ESS obtained the address of the mail server of the TESP from the at least one DNS server;

modify, by the TESP, the email to include the token;

forward the modified email to a primary email service (PEM) of the user, to cause the PEM to:

validate the token using the public key obtained from the at least one DNS server;

verify that the email meets the usage limit criterion; and forward the email to a PEM inbox of the user based on the validating and the verifying.

12. The system of claim 11, wherein the email is a first email, and wherein the system further configured to:

receive, by the mail server of the TESP, a second email from the ESS;

modify the second email to include the token;

forward the modified second email to the PEM of the user, to cause the PEM to:

attempt a second validating of the token by decrypting the token with the public key obtained from the at least one DNS server; and in response to a failure of the second validating:

refrain from forwarding the second email to the PEM inbox of the user; and transmit a token invalidation notification to the mail server of the TESP;

deactivating the temporary email address.

13. The system of claim 11, wherein the usage limit criterion comprises a number of emails that are allowed to be sent to the temporary email address;

wherein the system is configured when verifying that the email meets the usage limit criterion, to:

retrieve, from the DNS server, the number of emails that are allowed to be sent to the temporary email address;

determine that fewer emails were received via the temporary email address than the number of emails that are allowed to be sent to the temporary email address;

cause, to be reduced, the number of emails that are allowed to be sent to the temporary email address.

14. The system of claim 11, wherein the system is further configured to:

maintain a database of trust level scores for email domains based on history of emails received from the email domains;

retrieve, from the database, a trust level score for the ESS; and wherein the stored usage limit criterion is based on the retrieved trust level score.

15. The system of claim 14, wherein the trust level score for the ESS is further based on at least one of a disapproved-list database or an approved-list database.

16. The system of claim 11, wherein the system is further configured to:

receive an indication of a data breach associated with the ESS;

based on the indication of the data breach:

invalidate the temporary email address; and refrain from processing emails directed to the invalidated temporary email address.

17. The system of claim 11, wherein the system is configured, when generating, by the TESP, the temporary email address for user registration of the user with an email sender server, to:

determine, from a plurality of eligible domain names associated with the TESP having respective reputation scores, a lead domain name having a highest respective reputation score; and select the lead domain name.

18. The system of claim 17, wherein the respective reputation scores are determined based on at least one of delivery success rate, bounce rates, approved-list status or disapproved-list status.

19. The system of claim 11, wherein the system is configured, when generating, by the TESP, the temporary email address for user registration of the user with an email sender server, to:

receive image data associated with a scanned matrix barcode, wherein the image data comprises an indicator for the ESS; and in response to receiving the image data comprising the indicator for the ESS, generate, by the TESP, the temporary email address for user registration of the user with the ESS.

20. The system of claim 11, wherein the system is configured, when generating, by the TESP, the temporary email address for user registration of the user with an email sender server, to:

receive a confirmation of authentication with a single sign-on service associated with the PEM;

in response to receiving the confirmation of authentication with the single sign-on service associated with the PEM, generate, by the TESP, the temporary email address for user registration of the user, wherein the TESP is a module of the PEM.

* * * * *